US009656687B2

(12) United States Patent
Koike et al.

(10) Patent No.: US 9,656,687 B2
(45) Date of Patent: May 23, 2017

(54) VEHICLE HAVING INDEPENDENTLY DRIVEN AND CONTROLLED RIGHT AND LEFT DRIVE WHEELS

(71) Applicant: Kubota Corporation, Osaka (JP)

(72) Inventors: Kazuo Koike, Sakai (JP); Hirokazu Ito, Sakai (JP); Yoshikazu Togoshi, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 14/450,778

(22) Filed: Aug. 4, 2014

(65) Prior Publication Data

US 2015/0039171 A1 Feb. 5, 2015

Related U.S. Application Data

(62) Division of application No. 13/422,055, filed on Mar. 16, 2012, now Pat. No. 8,838,311.

(30) Foreign Application Priority Data

Jun. 15, 2011 (JP) ................................. 2011-133671
Jun. 15, 2011 (JP) ................................. 2011-133672
Jun. 15, 2011 (JP) ................................. 2011-133673

(51) Int. Cl.
*B62D 11/04* (2006.01)
*B62D 6/04* (2006.01)
(Continued)

(52) U.S. Cl.
CPC ............ *B62D 6/04* (2013.01); *B60L 15/2036* (2013.01); *B60L 15/36* (2013.01); *B62D 11/003* (2013.01);
(Continued)

(58) Field of Classification Search
CPC ........ B62D 11/003; B62D 11/04; B62D 6/04; B60L 15/36; B60L 15/2036
(Continued)

(56) References Cited

U.S. PATENT DOCUMENTS 5,890,833 A 4/1999 Allen et al.
6,602,164 B2 8/2003 Yoshiaki et al.
(Continued)

FOREIGN PATENT DOCUMENTS

JP 63195033 A 8/1988
JP 6141614 A 5/1994
(Continued)

*Primary Examiner* — Nga X Nguyen
(74) *Attorney, Agent, or Firm* — The Webb Law Firm

(57) ABSTRACT

A self-propelled vehicle includes a maneuvering unit, a drive unit including first and second drive sections, which are driven and controlled by drive wheel control commands, a drive wheel unit including left and right drive wheels driven by the first and second drive sections, respectively, at least one caster wheel which is controlled by a caster wheel control command, a bank detector for detecting a degree of bank of the vehicle and a control unit including a drive wheel control section for generating the drive wheel control commands. The control unit further includes a caster wheel control section which generates the caster wheel control command for controlling the steering angle of the caster wheel during a bank traversing travel, based on the bank degree so as to resolve a difference between a target travel and the actual travel which occurs during the bank traversing travel.

6 Claims, 20 Drawing Sheets

(51) Int. Cl.
*B60L 15/36* (2006.01)
*B60L 15/20* (2006.01)
*B62D 11/00* (2006.01)

(52) U.S. Cl.
CPC ......... *B62D 11/04* (2013.01); *B60L 2240/421* (2013.01); *B60L 2240/461* (2013.01); *Y02T 10/645* (2013.01); *Y02T 10/7275* (2013.01)

(58) Field of Classification Search
USPC .................................. 701/22; 180/65.1, 6.5
See application file for complete search history.

(56) References Cited

U.S. PATENT DOCUMENTS

| | | |
|---|---|---|
| 7,073,613 B2 | 7/2006 | Wakitani et al. |
| 2009/0000839 A1 | 1/2009 | Ishii et al. |
| 2009/0260901 A1* | 10/2009 | Ishii ...................... A01D 34/78 180/6.5 |
| 2011/0127093 A1* | 6/2011 | Koga ................... B62D 11/003 180/6.24 |

FOREIGN PATENT DOCUMENTS

| | | | |
|---|---|---|---|
| JP | 2004120875 A | 4/2004 |
| JP | 2008168869 A | 7/2008 |
| JP | 2008168871 A | 7/2008 |
| JP | 2009255840 A | 11/2009 |
| JP | 2011115006 A | 6/2011 |

\* cited by examiner

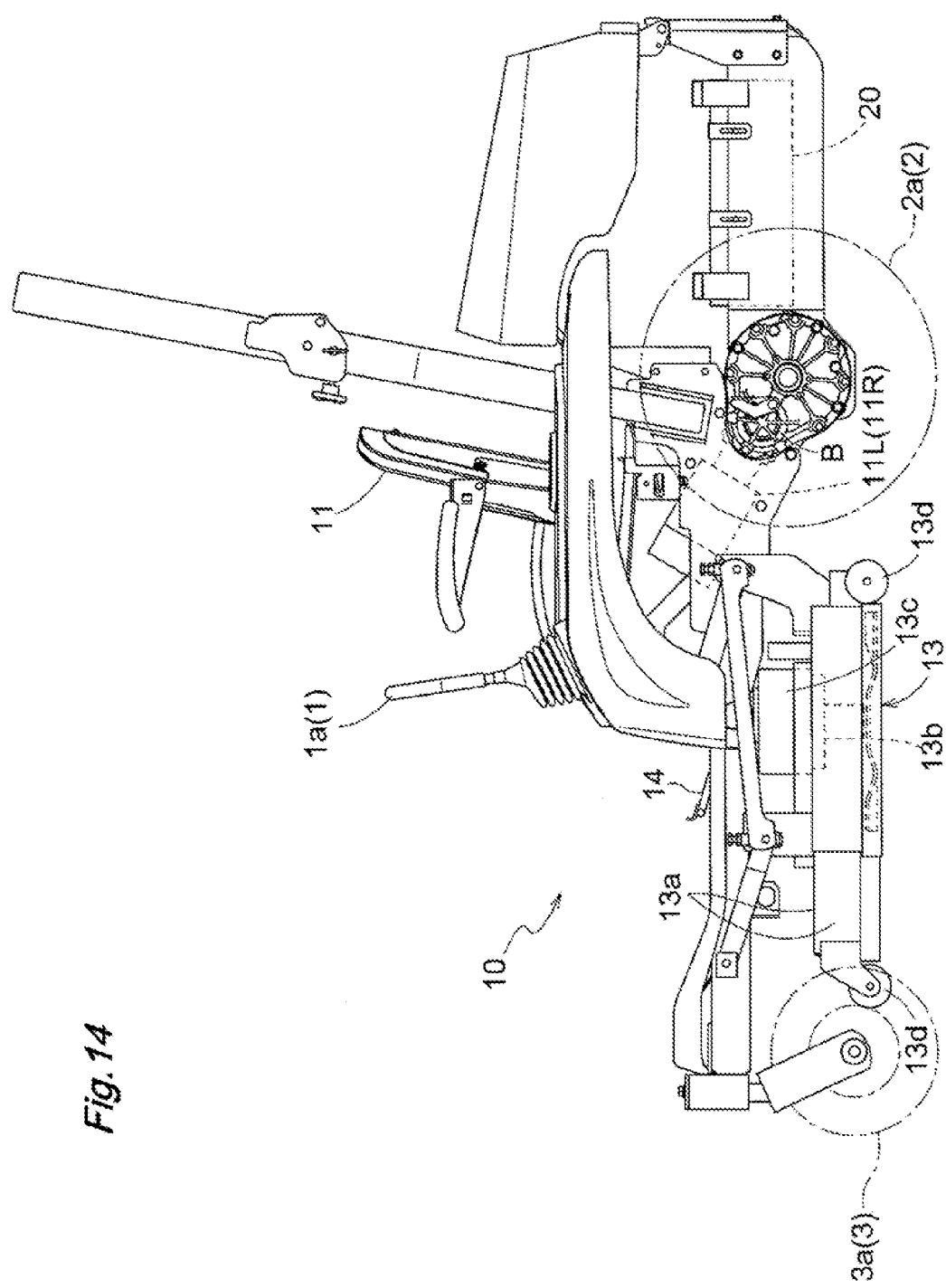

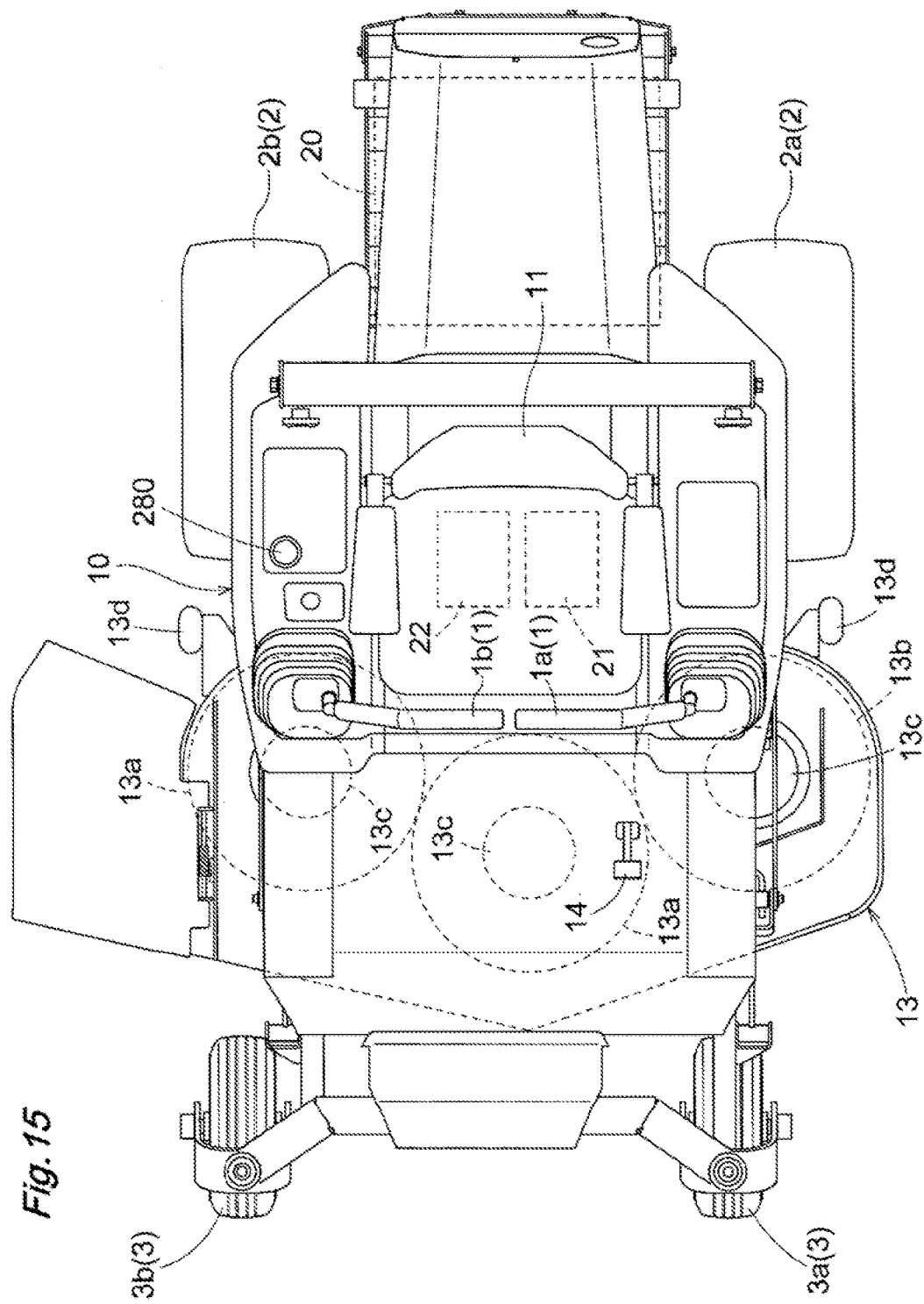

VEHICLE HAVING INDEPENDENTLY DRIVEN AND CONTROLLED RIGHT AND LEFT DRIVE WHEELS

BACKGROUND OF THE INVENTION

1. Field of the Invention

The present invention relates to a self-propelled vehicle having right and left drive wheels which are driven and controlled independently of each other.

2. Description of the Related Art

According to an example of such self-propelled vehicle as above, the vehicle includes a maneuvering unit which is operated by a driver, a drive unit having a first drive section and a second drive section which are driven and controlled independently of each other by a drive wheel control command, a drive wheel unit having a left drive wheel driven for traveling by the first drive section and a right drive wheel driven for traveling by the second drive section, at least one caster wheel which is controlled for steering angle by a caster wheel control command, a drive wheel control section for generating the drive wheel control command based on an operational amount from the maneuvering unit and a caster wheel control section for generating the caster wheel control command for controlling the steering angle of the caster wheel.

With the above-described self-propelled vehicle, by increasing the difference between speeds (circumferential speeds) of the left drive wheel and the right drive wheel, a small turn is made possible. Further, by rotating the left drive wheel and the right driven wheel in different directions from each other, a "super-skid turn (spin turn)" or so-called "zero turn" is made possible. Hence, the vehicle has good small turn performance. For this reason, the vehicle can be used advantageously as a fork lift, a grass mower, etc. However, when the traveling surface is a sloping surface, an inclined downward force is applied to the wheels, so the vehicle tends to make a turn inclinedly downward. Especially, when the vehicle is traveling by inertia, no torque is not transmitted to the wheels, so the vehicle will make an inclinedly downward turn inadvertently.

As a solution to the above-described problem, according to a riding type grass mower vehicle disclosed in the Japanese Unexamined Patent Application Publication No. 2008-168871 (JP 2008-168871 A) (paragraphs [0012-0033, 0080-0106], FIG. 3, FIG. 4), the vehicle includes at least two main drive wheels and a caster wheel, the main drive wheels being driven by a traveling power source. The vehicle further includes a switching means for switching to either a forcible steering mode in which the caster wheel is forcibly steered by a steering power source, or to a free steering mode in which the caster wheel is rendered freely steerable by blocking the power transmission from the steering power source. With this vehicle, in the case of traveling on or traversing a ground surface or grass field having a slope (bank) angle (such traveling as this will be referred to as "a bank traversing travel" herein), the mode is switched over to the forcible steering mode, whereby it becomes possible to prevent the caster wheel to be oriented more downward than the direction desired by the driver. For instance, an optimal steering angle optimal for the turn determined by an operational lever is forcibly applied to the caster wheel. Further, JP 2008-168871 A discloses that there is provided a switching means for switching from a first drive mode in which only the main drive wheels are driven and a second drive mode in which both the main drive wheels and the caster wheel are driven, so that during a hill climbing travel of the vehicle on a sloping surface, if there occurs a slip on the grass surface in the main wheels by an amount exceeding a predetermined value, both the main drive wheels and the caster wheel are driven. There is also disclosed that in case the grass mower vehicle is stopped on a sloping surface, an electric motor is controlled so as to generate a torque in the vicinity of zero rotational speed of the motor, in accordance with a sloping angle detected by a slope sensor.

With the above-described self-propelled vehicle according to JP 2008-168871 A, the vehicle is effective for restricting the inclinedly downward turning tendency which occurs during an inertia travel on a sloping surface. However, no consideration is given to such use condition in which traveling on a sloping surface is effected with driving the drive wheels and with a similar maneuvering feel for the driver to that for traveling on a flat terrain. When a self-propelled vehicle having a free caster wheel and right and left drive wheels effects a bank traversing travel, only providing the caster wheel with an optimal steering angle for the turn determined by the operational lever is not sufficient. It is additionally needed to take into consideration the gravitational load applied by the bank of the vehicle; that is, it is necessary to provide the caster wheel with the optimal steering angle based on a detected vehicle bank degree.

As another solution to the above-described problem, in the Japanese Unexamined Patent Application Publication No. 2009-255840 (JP 2009-255840 A) (paragraphs [0012-0026, 0098-0109], FIG. 12-FIG. 13), there is proposed an electrically powered ground work vehicle including right and left drive wheels as main drive wheels that are driven for traveling independently by right and left electric motors, at least one caster wheel as a freely steerable steering wheel, a utility work implement driven for effecting a ground work, an acceleration operational member for providing instruction for acceleration, a turn operational member for providing instruction for turn, and a control section for braking the right and left wheels for regeneration by controlling a regeneration braking drive section for regenerating electric power from the right and left electric motors to an electric power source unit, when the acceleration operational member is not operated during vehicle travel. The control section of this electrically powered ground work vehicle controls braking forces of the right and left wheels in such a manner that the braking force for the one wheel which is positioned on the inner side of the turn is greater than the braking force for the other wheel which is positioned on the outer side of the turn, when the acceleration operational member is not operated and a turn command is inputted from the turn operational member.

Specifically, there are provided a roll angle detecting means (a roll angle sensor) for detecting a state wherein the vehicle is pivotally inclined relative to an axis extending through the center of gravity of the vehicle oriented along the fore/aft direction, and a roll angle correcting means. With the roll angle correcting means, during an inertia travel or a pedal braked condition when the accelerator pedal is not operated during travel and when the roll angle θ indicated by the signal of by the roll angle sensor is not 0 (zero), the correcting means corrects the braking forces for the respective right and left wheels according to this roll angle θ so that the wheels may be oriented to the direction corresponding to the operational direction of the steering operational member at the time of flat terrain travel when the roll angle θ is 0 (zero). With this arrangement, the right and left wheels 1 are driven for traveling independently of each other. For instance, in the electrically powered ground work vehicle capable of turning due to a rotational speed difference between right and left electric motors, stable traveling of the vehicle can be ensured even when the acceleration operational member is not operated during traveling such as in an inertial travel.

With the above self-propelled vehicle according to JP 2009-255840 A, this vehicle is effective for restricting the inclinedly downward turning tendency of the vehicle which occurs during an inertial travel on a sloping surface. However, no consideration is given to such use condition similar to the maneuvering on a flat terrain, when the wheels are driven on a sloping surface. In the case of traveling on or traversing a ground surface or grass field having a bank angle (such traveling will be referred to as "bank traversing travel" herein), it is necessary to control the driving of the right and left drive wheels with taking the inclinedly downward turning tendency into consideration. Such maneuvering requires experience and skill.

Further, according to a self-propelled vehicle known from the Japanese Unexamined Patent Application Publication No. 2008-168869 (JP 2008-168869 A), whenever a desired travel speed and turning condition are commanded by a maneuvering unit, the vehicle obtains a target speed and a driving torque required for obtaining such target speed for each one of a pair of electric motors so that the vehicle may travel at the commanded travel speed and turning condition and the respective electric motors are controlled so as to provide the required target speeds and also to output the required torques.

With this self-propelled vehicle according to 2008-168869, as the desired travel speed and turning condition are commanded by the maneuvering unit and the target speeds for the right and left drive wheels are set separately, not only straight forward travel, reverse travel, but also turning travels in the forward and reverse directions respectively are made possible. So, the vehicle may be employed as a grass mower or the like advantageously. However, in order that the vehicle may always travel at a commanded travel speed and turning condition, a target speed for each one of the pair of electric motors and the drive torque for obtaining this target speed are obtained and the operations of the respective electric motors are controlled so as to provide the required target speeds and the required drive torques. For this reason, though will be explained in greater details later, if a control command speed and a control command drive torque are issued based on information from the maneuvering unit in an output restricted range which exceeds the rated range (e.g. a short period operation possible range or an output impossible range described above), the turning intended by the operator may not be possible.

In view of the above-described state of the art, there is a need for a self-propelled vehicle capable of being freely driven for traveling and traversing a sloping surface without requiring experience or skill. Further, it is desired that the turning travel intended by the driver may be readily effected based on information from the maneuvering unit even when a control command speed and a control command drive torque are issued in an output restricted range which exceeds the rated range.

SUMMARY OF THE INVENTION

The above-noted object is fulfilled according to a self-propelled vehicle proposed by the present invention, as under:

A self-propelled vehicle comprising:
a maneuvering unit operated by a driver;
a drive unit including a first drive section and a second drive section which are driven and controlled independently of each other by respective drive wheel control commands;
a drive wheel unit including a left drive wheel driven for traveling by the first drive section and a right drive wheel driven for traveling by the second drive section;
at least one caster wheel which is controlled in a steering angle thereof by a caster wheel control command;
a bank detector for detecting a degree of bank of the vehicle; and
a control unit including a drive wheel control section for generating said drive wheel control commands based on an operational amount of the maneuvering unit, said control unit further including a caster wheel control section which generates the caster wheel control command for controlling the steering angle of the caster wheel during a bank traversing travel, based on said bank degree so as to resolve a travel direction difference which occurs during said bank traversing travel between a target travel and an actual travel.

The above structure is advantageous in following respects.

In the case of a bank traversing travel wherein the vehicle travels on a sloping surface while traversing this surface (travel of the vehicle with an inclination thereof about the axis along the vehicle longitudinal direction), an inclinedly downward force is applied to the wheels, so the vehicle tends to slip off the sloping surface downwards. Moreover, as this inclinedly downward force varies according to the degree of the bank of the vehicle, the travel intended by the driver will be impaired unless this degree of vehicle bank is taken into consideration. Hence, there is a need for realizing a caster wheel steering angle which creates a force component for offsetting or canceling out this inclinedly downward force, that is, such a force component that resolves a difference between the target travel direction and the actual travel direction during this bank traversing travel. With the above-described arrangement of the present invention, the arrangement obtains, based on the bank degree, such steering angle for the caster wheel that will resolve the difference between the target travel direction and the actual travel direction during the bank traversing travel, that is, such force component that will create a force component that resolves the difference between the target travel direction and the actual travel direction, and the caster wheel is controlled to this steering angle. With this, vehicle travel intended by the driver is made possible during the bank traversing travel also.

As described above, in order to more effectively create the force component for resolving the direction difference, this can be done by driving the caster wheel for traveling. Namely, the force component for resolving the direction difference is to be created by the torque of the caster wheel. To this end, according to one preferred embodiment of the present invention, the self-propelled vehicle further comprises a caster wheel drive section for driving the caster wheel for traveling, wherein said caster wheel control section causes said travel wheel control commands to include a caster wheel rotation control command which is given to said caster wheel drive section so as to output a compensation torque for resolving the travel direction difference, based on the bank degree.

With this self-propelled vehicle, it is desirable that the drive unit and the caster wheel drive section can effect the torque control and the speed control easily and speedily. Thus, according to one particularly preferred embodiment, the drive unit and the caster wheel drive section are constituted of electric motors. As other possible construction for the drive unit, it is also possible to employ a hydrostatic transmission device. As the drive source for the hydrostatic transmission device, an engine (an internal combustion engine) is suitable. However, a hybrid arrangement combining an engine and a rotary electric machine (a motor and a generator) can be used also. Further, the swash plate control for the hydrostatic transmission device can be either hydraulic type control or an electric type control.

The caster wheel control command for forcibly changing the steering angle of the caster wheel and the caster wheel rotation control command for forcibly rotating the caster wheel give significant influence on the maneuvering feel. And, as this maneuvering feel varies depending on the individual driver, it will be advantageous if use thereof can be decided freely by the driver. Therefore, according to one preferred embodiment of the present invention, said caster wheel control command and/or said caster wheel rotation control command are/is outputted based on an operation of a manual operational tool.

The above-noted object is fulfilled according to another self-propelled vehicle proposed by the present invention also, as under:

A self-propelled vehicle comprising:
a maneuvering unit operated by a driver;
a control unit for generating a control amount based on an operational amount of the maneuvering unit;
at least one freely steerable caster wheel;
a drive unit including a first drive section and a second drive section which are driven and controlled independently of each other by said control amount;
a drive wheel unit including a left drive wheel driven for traveling by the first drive section and a right drive wheel driven for traveling by the second drive section, a travel direction being changed by a rotation difference between the left drive wheel and the right drive wheel; and
a bank detector for detecting a degree of bank of the vehicle and outputting it to said control unit;
wherein said control unit includes:
 a drive torque calculation section for calculating drive torque required for said first drive section and said second drive section;
 a compensation torque calculation section for calculating a compensation torque for resolving a direction difference between a target travel direction and an actual travel direction in a bank traversing travel, for said first drive section and said second drive section based on said bank degree; and
 a correction section for correcting said control amount based on said required drive torque and said compensation torque.

The above structure is advantageous in following respects.

In case there is a significant traveling resistance occurring between the traveling ground or road surface and the wheels during traveling of the vehicle, shortage in the torque, if any, will lead to reduction in the vehicle speed or stop of the vehicle unintended by the driver. In order to avoid this, the required drive torque is calculated and the drive control is carried out so that the calculated required torque may be outputted. Further, in the case of a bank traversing travel wherein the vehicle travels on a sloping surface while traversing this surface (travel of the vehicle with bank thereof about the axis along the longitudinal direction of the vehicle), an inclinedly downward force is applied to the wheels, so the vehicle tends to slip off the sloping surface downwards. Moreover, as this inclinedly downward force varies according to the degree of the bank of the vehicle, the travel intended by the driver will be prevented. Then, a torque for offsetting this inclined downward force, that is, a torque for resolving a difference between the target travel direction and the actual travel direction during a bank traversing travel (this torque is referred to as the "a compensation torque" herein) is calculated by the compensation torque calculating section, based on the bank degree of the vehicle. This calculated compensation torque is used for correcting the control amount generated based on the operational amount of the maneuvering unit, together with the required drive torque. Then, by drive control based on this correction control amount, travel intended by the driver is made possible also during the bank traversing travel.

According to one preferred embodiment of the drive torque calculation section for calculating the required drive torque, the drive torque calculation section calculates the required drive torque, based on a target rotational speed and an actual rotational speed in each of the first drive section and the second drive section. As the target rotational speed, there are used the rotational speeds of the first drive section and the second drive section which can be obtained from the control amount of the maneuvering unit, with use of e.g. an operational amount/rotational speed table prepared in advance. And, the actual rotational speed can be obtained by determining the rotational speed of the wheel or the power transmission line to the wheel.

The compensation torque will vary, according to the bank degree of the vehicle during its bank traversing travel which is determined by the bank angle of the sloping surface and the traveling direction of the vehicle traveling thereon and the weight of the vehicle. Further, this torque varies according also to the body structure of the vehicle. For this reason, advantageously, there is employed a compensation torque deriving table for deriving said compensation torque, with using, as an input parameter thereof, a vehicle bank degree, said table being prepared by obtaining a compensation torque for resolving slip-off of the vehicle for each vehicle bank degree, through experiments and learning.

When the self-propelled vehicle has the function of transporting a certain load or object, according to the weight of this load, more particularly, according to the weight distribution of the load on the vehicle, the value of the compensation torque will vary in this case as well. For this reason, according to one preferred embodiment of the present invention, said compensation torque deriving table sets also a vehicle weight distribution value as another input parameter thereof. That is, by experiment and learning with using the vehicle bank degree and the vehicle weight distribution value as input parameters, the compensation torque deriving table is constructed. With this, good maneuvering feel during bank traversing travel can be obtained, regardless of variation of load weight.

With this self-propelled vehicle, it is desirable that the torque control and the speed control are effected easily and speedily. Then, according to one particularly preferred embodiment, the drive unit is constituted of an electric motor. As other possible construction for the drive unit, it is also possible to employ a hydrostatic transmission device. As the drive source for the hydrostatic transmission device, an engine (an internal combustion engine) is suitable. However, a hybrid arrangement combining an engine and a rotary electric machine (a motor and a generator) can be used also. Further, the swash plate control for the hydrostatic transmission device can be either hydraulic type control or an electric type control.

A self-propelled vehicle which allows turning travel intended by the driver even if a control command speed and a control command drive torque are commanded in an output restricted range which exceeds the rated range, is constructed as follows:

A self-propelled vehicle comprising:

a pair of electric motors for causing right and left traveling devices to be driven independently of each other so as to effect a straight travel state and a turning travel state of the vehicle;

a manually operated maneuvering unit for commanding a travel speed and a turning condition of the vehicle;

a rotation detection sensor for detecting a rotational speed of each one of the electric motors;

a control unit for controlling the operation of each electric motor based on information from said maneuvering unit and said rotation detection sensor;

wherein said control unit executes a target speed calculation process, a speed/torque calculation process, a correction process and a motor drive process;

said target speed calculation process obtains a target speed for each one of the electric motors based on the information from the maneuvering unit;

said speed/torque calculation process obtains a control command speed for commanding each electric motor and a control command drive torque required for obtaining the control command speed, based on the target speed obtained for each electric motor by the target speed calculation process and a rotational speed of each motor detected by said rotation detection sensor;

when the control command speed and the control command drive torque obtained by the speed/torque calculation process are in an output restricted range which exceeds a rated range wherein the electric motor can be driven continuously, said correction process corrects said control command speed and said control command drive torque so that a speed difference between the control command speeds of the respective motors may be maintained within a speed difference corresponding to a turning condition of the vehicle commanded by said maneuvering unit; and also that said control command speed and said control command drive torque may return to said rated range; and said motor drive process controls the operations of the respective electric motors so as to output at said control command speed after the correction thereof by the correction process and the control command drive torque after the correction thereof.

With the above arrangement, the control unit obtains a target speed for each one of the electric motors based on information from the maneuvering unit and then based on the obtained target speed and the rotational speed of the electric motor, there are obtained a control command speed for commanding each electric motor and a control command drive torque required for obtaining the control command speed.

And, if the obtained control command speed and control command drive torque are in the output restricted range, the control command speed and control command drive torque are corrected so that the speed difference between the control command speeds of the respective electric motors may be maintained to the speed difference corresponding to the turning condition of the vehicle commanded by the maneuvering unit and also the control command speed and the control command drive torque may return to said rated range. Thus, the operations of the respective electric motors are controlled so as to output the corrected control command speeds and the corrected control command drive torques.

As a result, even when speeds and torques are commanded in the output restricted range exceeding the rated range, the pair of electric motors can maintain the speed difference corresponding to the turning condition of the vehicle commanded by the maneuvering unit, so that the desired turn travel intended by the driver is made possible. Moreover, since the control command speed and the control command drive torque may return to the rated range, the condition of effecting the desired turn travel can be maintained as it is.

Therefore, it has been made possible to provide a work vehicle capable of effecting a turn travel intended by the driver even when speeds and torques are commanded in the output restricted range exceeding the rated range based on information from the maneuvering unit.

According to one preferred embodiment of the above, said electric motor has, as said output restricted range, a short period operation possible range in which the motor can be operated only during lapse of a predetermined period, and when the control command speed and the control command drive torque obtained by the speed/torque calculation process are in said short period operation possible range, said electric motor can be operated only until lapse of said predetermined period. With this arrangement, if a control command speed and a control command drive torque in the short period operation possible range are commanded as result of an operation of the maneuvering unit by the driver, the travel condition and the turn condition as commanded are obtained immediately after the commanding. However, upon lapse of the predetermined period, driving at this control command speed and control command drive torque is disabled. Yet, even in the case of using such electric motor having such short period operation possible range, turn travel intended by the driver is made possible through correction of the control command speed and control command drive torque by the correction process.

Further, according to one preferred embodiment, when the maneuvering unit is commanding increase of the travel speed and also the turn condition for turning the vehicle body in either right or left direction, the speed/torque calculation process calculates the control command drive torques for the respective electric motors, with a unit change amount of the control command drive torque for one of the electric motors which corresponds to the one of the travel devices lying on an outer side of the vehicle turn being set greater than a unit change amount of the control command device torque for the other electric motor which corresponds to the travel device lying on an inner side of the vehicle turn. With this arrangement, as the control unit is configured to calculate the control command drive torques for the respective electric motors such that a unit change amount of the control command drive torque for one of the electric motors which corresponds to the turning outer side travel device is set greater than a unit change amount of the control command device torque for the other electric motor which corresponds to the turning inner side travel device. Therefore, in such case as the diver commands a turning travel with progressively increasing the travel speed from the straight travel stopped condition, for instance, the turning travel will be effected with the drive torque of the travel device on the turning outer side being set positively greater than the drive torque of the travel device on the turning inner side.

Other features and their advantageous effects will be apparent upon reading the detailed description as under, with reference to the accompanying drawings.

BRIEF DESCRIPTION OF THE DRAWINGS

FIG. 14 is an overall side view showing a riding type electric powered grass mower which is one example of a self-propelled vehicle in the third embodiment, FIG. 15 is an overall plan view showing the riding type electric powered grass mower as a self-propelled vehicle in the third embodiment.

DETAILED DESCRIPTION OF PREFERRED EMBODIMENTS

First Embodiment

A first embodiment of the present invention will be described with reference to the accompanying drawings.

Figure 1:
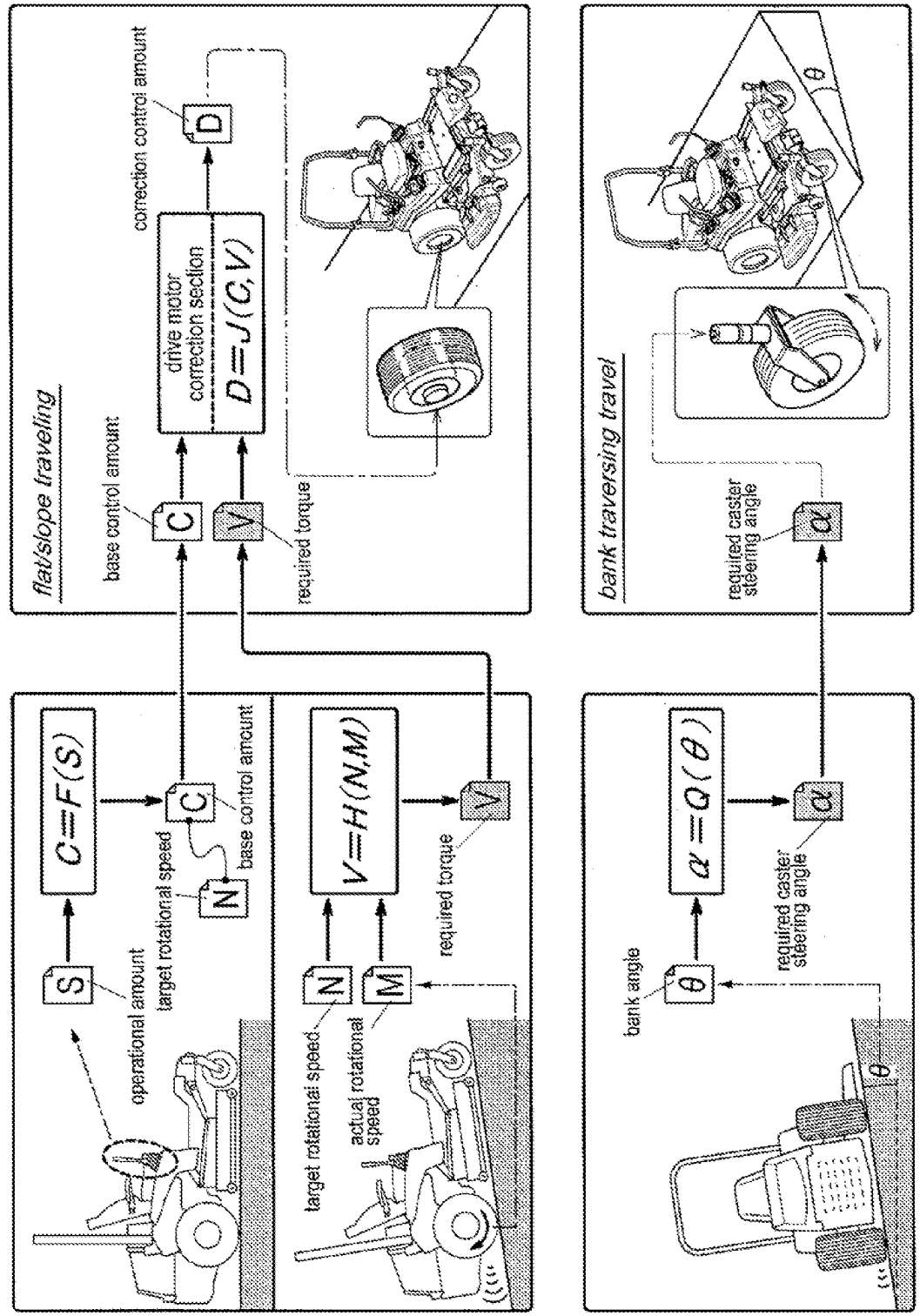
FIG. 1 is a diagram illustrating the basic principle of a caster wheel steering control at the time of a bank traversing travel in a first embodiment of the present invention.

Before description of specific construction of a self-propelled vehicle according to the first embodiment of the present invention, with reference to FIG. 1, there will be described the basic principle of the caster wheel control during a bank traversing travel which characterizes this first embodiment. In this embodiment, the self-propelled vehicle includes a pair of right and left drive wheels (rear wheels) driven by electric motors (which will be referred to simply as "motors" hereinafter) as drive wheel units, and a pair of right and left caster wheels as front wheels that can be changed in the steering angles by the motors. Further, this self-propelled vehicle mounts, on its vehicle body, a mower unit which is one example of a utility work implement, and thus the vehicle functions as a riding type electric powered grass mower.

A maneuvering unit operated by the driver outputs an operational amount for driving intended by the driver in the form of sensor detection signals in general. From this operational amount, a control unit generates base control amounts for controlling the right drive wheel motor and the left drive wheel motor. And, as the motors are driven based on these base control amounts, predetermined rotational speeds (speeds) and torques are generated in the respective drive wheels. For this reason, in the following discussion, it is assumed that the base control amount includes a torque: U and a speed: N. Derivation of the base control amount from the operational amount of the maneuvering unit is done through a map which tabulates relationship therebetween. Assuming S denotes the operational amount and C denotes the base control amount, the relational expression (map table): F can be represented as follows.

$$C=F(S)$$

As the pair of right and left rear wheels are controlled independently of each other, the above expression can be represented as CL=F(SL) for the left rear wheel line and as CR=F(SR) for the right rear wheel line, respectively.

In a hill-climbing travel or a rough terrain travel, there is the possibility of torque shortage, wherein the torque generated by the base control amount falls short of the torque required for the travel intended by the driver. This torque shortage, that is, the required drive torque required for normal drive (which will be referred to simply as "required torque" hereinafter): V can be derived as follows with using a relational expression: H which is prepared from a target rotational speed: N included in the base control amount and an actual rotational speed: M, which is the rotational speed obtained from a rotational speed detection sensor:

$$V=H(N,M)$$

Therefore, the control unit corrects the base control amount based on the required torque and generates a correction control amount. The correction expression: J is provided for deriving the correction control amount: D with using the base control amount: C and the required torque: V as input parameters and this expression is represented as follows:

$$D=J(C,V)$$

Incidentally, at the time of flat terrain travel in which the vehicle travels on a flat ground surface which provides only small traveling resistance, the required torque: V=0 and the compensation torque: W=0. Thus, the correction control amount: K becomes equal to the base control amount: C. In a hill-climbing travel or a rough terrain travel, with correction of the control amount so as to add the required torque thereto, there is realized traveling without torque shortage.

In a bank traversing travel, there is generated the correction control amount: K such that the compensation torque: W may be added thereto or the required torque: V may be added thereto when needed, and the rear wheels are driven for traveling based on this correction control amount: K. In the above, the compensation torque: W can be provided separately for the right and left rear wheels. For instance, it is conceivable to employ an arrangement of adding a negative compensation torque to one wheel and adding a positive compensation torque to the other wheel.

On the other hand, in the case of a bank traversing travel, an inclinedly downward force is applied to the wheels, so that the vehicle tends to turn in the inclinedly downward direction. Especially, to a caster wheel under its free condition, there is applied a force that tends to change the steering angle thereof to the inclinedly downward direction. In order to ensure the same maneuverability for the vehicle as that at the time of flat terrain travel, despite this force in the inclinedly downward direction, it is necessary to change the steering angle of the caster wheel in the opposite direction so as to cancel out the inclinedly downwardly turning tendency. Here, this steering angle will be referred to as "required caster steering angle". As the inclinedly downward force applied to the wheel varies according to the bank degree of the vehicle, the required caster steering angle for offsetting this too varies according to the bank degree of the vehicle.

Therefore, the relationship for deriving the required caster steering angle with using the vehicle bank degree as the input parameter is constructed in advance through experiments and learning the results of the experiments. For simplicity of the explanation, it is assumed that the vehicle is to traverse a sloping surface horizontally and the bank degree is the rolling degree of the vehicle, that is, bank angle:$\theta$. Then, the relational expression: Q for deriving the required caster steering angle: $\alpha$ is represented as follows:

$$\alpha = Q(\theta)$$

Then, a caster wheel control command is generated so that the right and left caster wheels assume this required caster steering angle. Incidentally, the required caster steering angles for the right and left caster wheels need not be same, but the respective optimal angles thereof can be calculated as follows $$\alpha L = QL(\theta), \alpha R = QR(\theta)$$

In this way, as the caster wheel is controlled to be set to the required caster steering angle and also correction of the rear wheel drive force by the required torque is effected when needed, even in the bank traversing travel, the tendency of the vehicle turning in the inclinedly downward direction is restricted and the maneuverability is improved.

Figure 2:
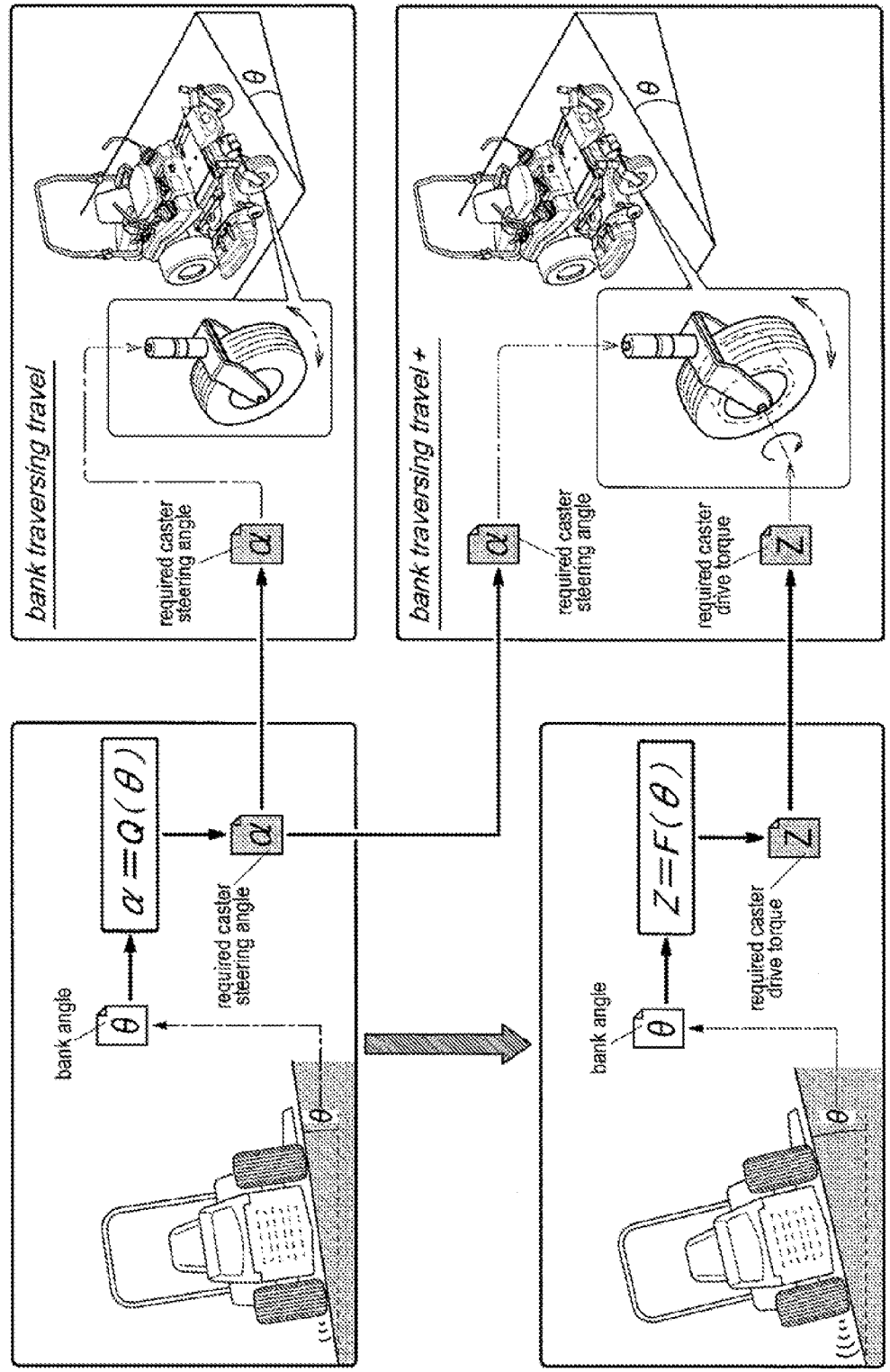
FIG. 2 is a diagram illustrating the basic principle of combined control of the caster wheel steering control and a caster wheel rotation control during the bank traversing travel.

In case just setting a steering angle to the caster wheel is insufficient for canceling out the tendency of the vehicle turning in the inclinedly downward direction due to the vehicle bank degree being large or the sloping surface being slippery, the present invention further proposes rotatably driving the caster wheel. Namely, a torque for canceling out the tendency of the vehicle turning in the inclinedly downward direction applied to the caster wheel is applied to the caster wheel. In this caster wheel rotation control, as schematically shown in FIG. 2, in this case too, for simplicity of the explanation, it is assumed that the vehicle is to traverse a sloping surface horizontally and the bank degree is the rolling degree of the vehicle, that is, bank angle:$\theta$. Then, the relational expression: F for deriving the required caster driving torque: Z is represented as follows.

$$Z = F(\theta)$$

This relational expression can be prepared through experiments and learning of the results thereof. This required caster driving torque too can have a different value for each of the right and left caster wheels. Further, instead of effecting the caster wheel rotation drive and the caster wheel steering maneuvering together, the caster wheel rotational drive alone can be effected.

Figure 3:
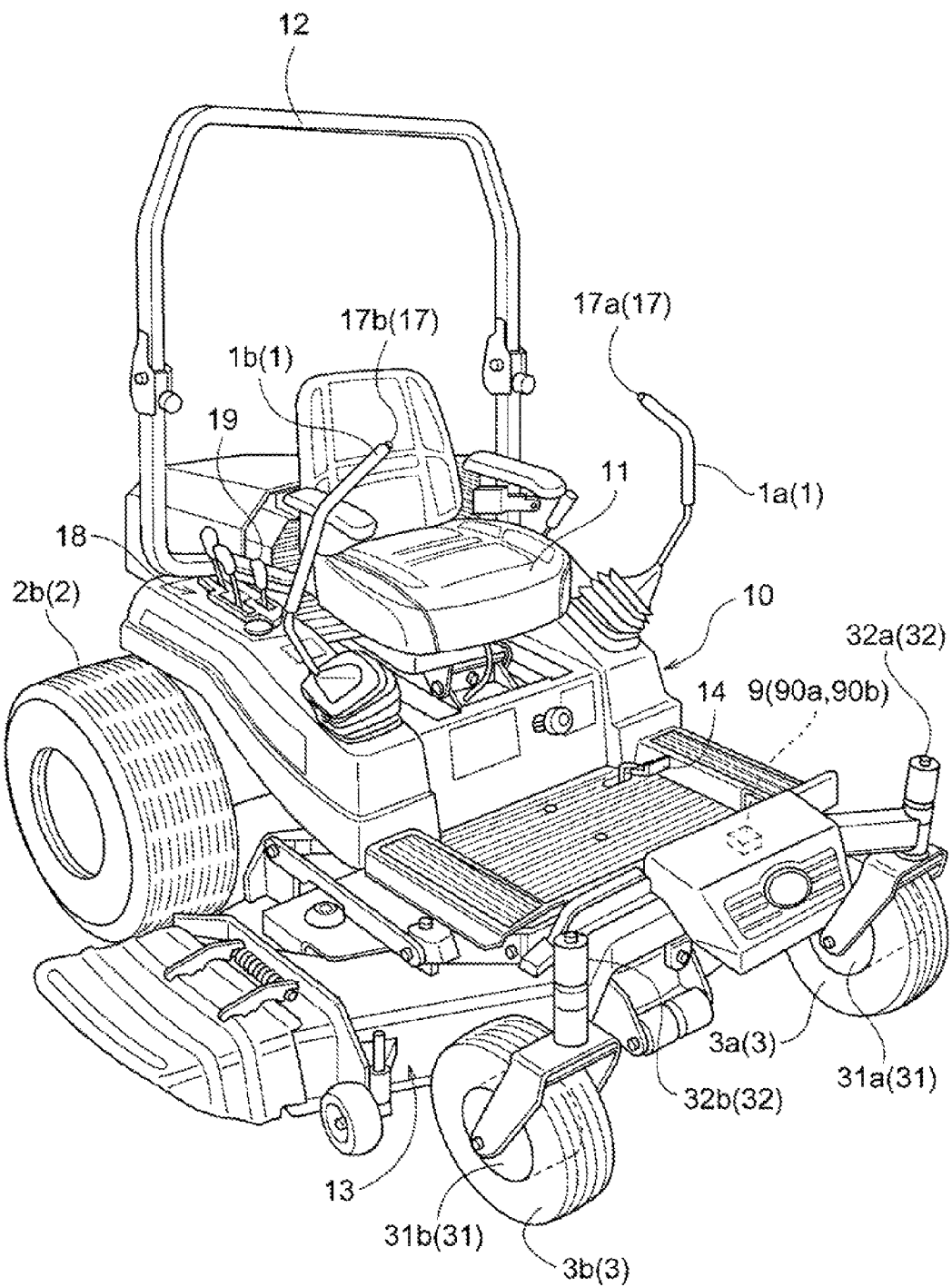
FIG. 3 is a perspective view showing a riding type electric powered grass mower which is one example of a self-propelled vehicle in the first embodiment.
Figure 4:
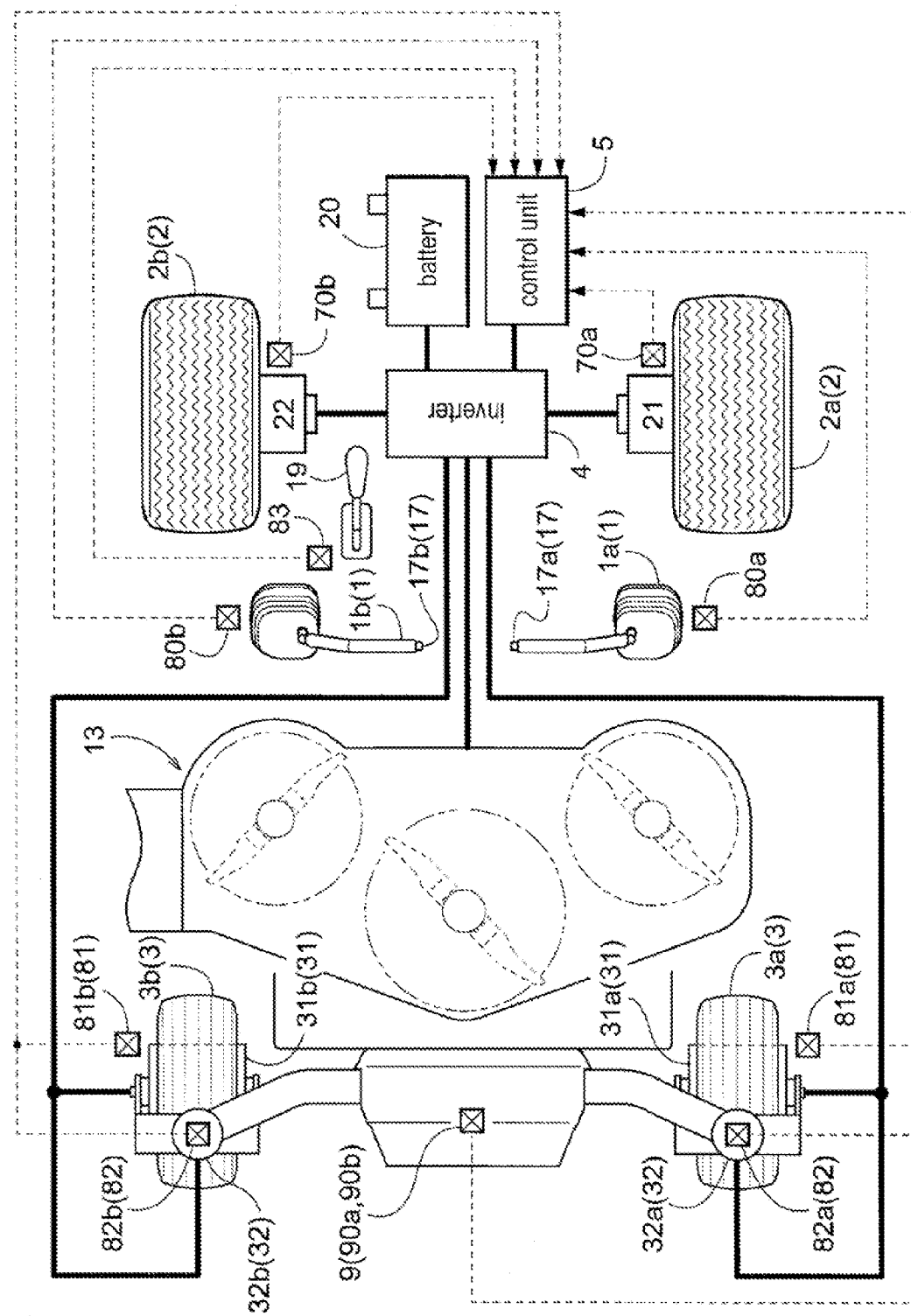
FIG. 4 is a system diagram showing an electric line system and a power line system of the riding type electric powered grass mower.

Next, there will be described a specific construction of a self-propelled vehicle implementing the above-described drive control principle at the time of bank traversing travel. As shown in FIG. 3 and FIG. 4, in this case too, the self-propelled vehicle is constructed as a riding type electric powered grass mower. The vehicle includes a maneuvering unit 1 operated by a driver, a control unit 5 for generating a control amount based on an operational amount of the maneuvering unit 1, a drive unit having a first drive section 40A and a second drive section 40B that are driven and controlled independently of each other by control commands, and a rear wheel unit having a left drive wheel 2a driven for traveling by the first drive section 40A and a right drive wheel 2b driven for traveling by the second drive section 40B. Changing of the traveling direction of the vehicle is realized by a rotation difference and/or a drive torque difference between the left drive wheel 2a and the right drive wheel 2b.

A caster wheel unit 3 consists of a pair of right and left caster wheels 3b, 3a which are configured to allow change of their steering angle and rotational drive. Each caster wheel 3a, 3b includes a drive motor 31a, 31b as an in-wheel motor for rotationally driving the caster wheel and a steering motor 32a, 32b for changing the steering angle. In this case, the drive motors 31a, 31b constitute a caster wheel drive section.

The general appearance of the riding electric powered grass mower is shown in the perspective view of FIG. 3. And, its electric line system and power line system are diagrammatically shown in FIG. 4. As may be understood from FIG. 3 and FIG. 4, this riding electric powered grass mower includes a vehicle body 10 supported by the caster wheel unit 3 comprising the front wheels and the drive wheel unit 3 comprising the rear wheels, a battery 20 mounted at a rear portion of the vehicle body 10, a driver's seat 11 disposed forwardly of the battery 20, a rollover protection frame 12 mounted erect rearwardly of the driver's seat 11, and a mower unit 13 suspended from the vehicle body 10 to be lifted up/down by a lift link mechanism in the space downwardly of the vehicle body 10 and between the caster wheel unit 3 and the drive wheel unit 2. Electric power supply to the drive wheel unit 2 and the mower unit 13 is effected via an inverter 4 which is operated under control by the control unit 5 which will be referred to also as an ECU.

Forwardly of the driver's seat 11, there is provided a floor plate which serves as a foot rest for the driver. From this, a brake pedal 14 projects. On the opposed sides of the driver's seat 11, there is provided a maneuvering unit 1 consisting of a left maneuvering lever 1a and a right maneuvering lever 1b which are pivotable about a horizontal pivot axis extending along the traverse direction of the vehicle body. Further, on one side of the driver's seat 11, in this case on the left side thereof, there is provided an electric operational panel 18 including switch buttons, switch levers, etc. of the electric control line. As manual operational tools for the caster wheel unit 3, there are provided a left maneuvering switch 17a for commanding a left steering angle maneuvering of the right and left caster wheels 3b, 3a, a right maneuvering switch 17b for commanding a right steering angle maneuvering of the right and left caster wheels 3b, 3a, and a caster wheel drive lever 19 for commanding rotational drive (traveling rotational drive) of the right and left caster wheels 3b, 3a. The left maneuvering switch 17a is attached to the leading end of the left maneuvering lever 1a. The right maneuvering switch 17b is attached to the leading end of the right maneuvering lever 1b. The caster wheel drive lever 19 is disposed in the vicinity of the electric control panel 18.

In this embodiment, the left rear wheel 2a and the right rear wheel 2b depend respectively on the left wheel motor 21 and the right wheel motor 22 which are constituted as in-wheel motors, as the respective drive sources thereof. As shown by the functional block diagram of FIG. 5, the rotational speed and/or the torque respectively of the left wheel motor 21 and the right wheel motor 22 as the drive unit are/is varied by the electric power supplied independently from a left wheel power supply unit 41 and/or a right wheel power supply unit 42 each of which is constructed as an inverter 4. Hence, the rotational speeds (circumferential speeds) of the left rear wheel 2a and the right rear wheel 2b can be made different from each other and, with this speed difference between the right and left rear wheels, a turning of the riding electric powered grass mower is effected. That is, in this embodiment, a first drive section 40A consists of the left wheel power supply unit 41 and the left wheel motor 21; and a second drive section 40B consists of the right wheel power supply unit 42 and the right wheel motor 22. Namely, the drive unit consists of the left wheel motor 21 and the right wheel motor 22 in this embodiment.

To the caster wheel drive motors 31a, 31b and the caster wheel steering motors 32a, 32b, a steering power supply unit 43 and a drive power supply unit 44 constituted of inverters 4 provide electric power independently.

The power (control amount) outputted respectively from the left wheel power supply unit 41 and the right wheel power supply unit 42 corresponds to a target rotational speed (target speed) calculated by the control unit 5. In this, when the actual rotational speed (actual speed) becomes smaller than the target, the control amount is corrected so as to increase the motor output torque. Incidentally, though not shown, power supply to a blade motor for grass mowing accommodated in the mower unit 13 is also effected via the inverter 4.

Figure 5:
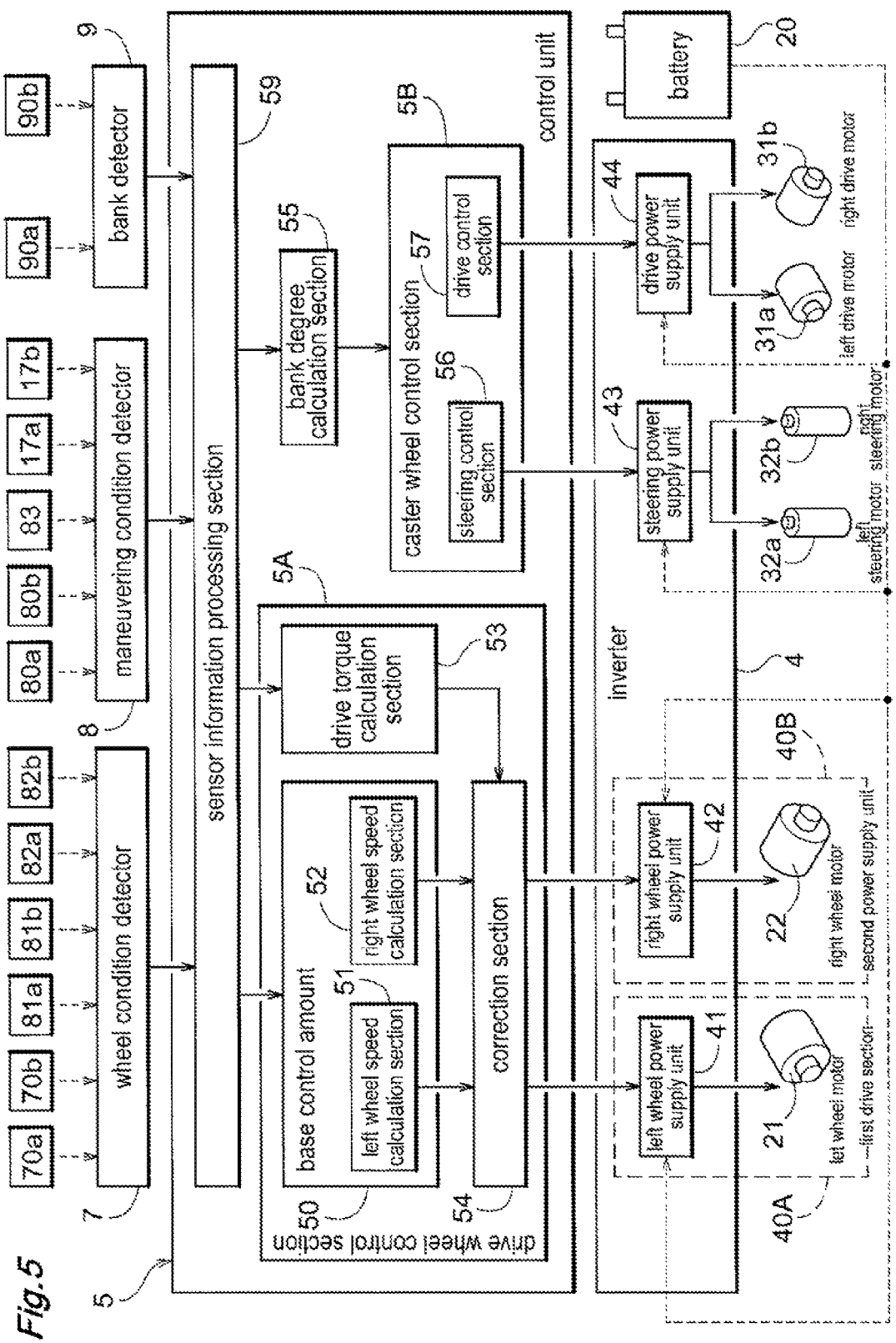
FIG. 5 is a functional block diagram of a control unit.

As shown in FIG. 5, the control unit 5 is connected to a wheel condition detector 7, a maneuvering condition detector 8 and a bank detector 9 as input devices; and the unit 5 is connected to the inverter 4 as an output device.

The wheel condition detector 7 includes various sensors for obtaining information relating to wheels, such as a left rear wheel rotation detection sensor 70a for detecting a rotational speed (wheel condition information) of the left rear wheel 2a, a right rear wheel rotation detection sensor 70b for detecting a rotational speed (wheel condition information) of the right rear wheel 2b, caster wheel rotation detection sensors 81a, 81b for detecting rotational speeds of the caster wheel drive motors 31a, 31b, caster wheel steering angle detection sensors 82a, 82b for detecting rotational speeds of the caster steering motors 32a, 32b, and so on.

The maneuvering condition detector 8 includes various sensors for obtaining information relating to maneuvering, such as a left maneuvering angle detection sensor 80a for detecting a pivotal angle (maneuvering condition information) of the left maneuvering lever 1a, a right maneuvering angle detection sensor 80b for detecting a pivotal angle (maneuvering condition information) of the left maneuvering lever 1b, a brake detection sensor for detecting an operational angle of the brake pedal 14, a lever operational detection sensor 83 for detecting an operation of the left steering switch 17a, the right steering switch 17b, the caster wheel drive lever 19, and so on.

The bank detector 9 includes a first bank sensor 90a for detecting a bank angle (bank degree information) about a vehicle longitudinal axis and a second bank sensor 90b for detecting a bank angle (bank degree information) about a vehicle transverse axis. Based on detection values of the first bank sensor 90a and the second bank sensor 90b, an inclinedly downward force component applied to the wheel during a bank traversing travel can be obtained. For the sake of convenience of the calculation, it may be assumed that a vehicle is effecting a bank traversing travel even when it is actually traveling obliquely on the bank surface and the bank degree of this vehicle is represented with normalization. Further, as this assumption renders the explanation simple also, in the following discussion, it is assumed that the bank degree discussed below is normalized to a bank degree in the bank traversing travel.

In the control unit 5, a base control amount calculation section 50, a drive torque calculation section 53, a correction section 54, a bank degree calculation section 55, a caster wheel control section 5B, a sensor information processing section 59, etc. are configured by execution of programs. However, these sections can also be configured as hardware if necessary.

The bank degree calculation section 55 calculates a bank degree of the vehicle based on detection signals from the above-described bank detector 9. The sensor information processing section 59 processes sensor signals inputted from the wheel condition detector 7, the maneuvering condition detector 8 and the bank detector 9; and converts the inputted signals into the information usable inside the control unit 5.

The base control amount calculation section 50 has the function of calculating base control amounts for the left wheel motor 21 and the right wheel motor 22 based on an operational amount of the maneuvering unit 1. The base control amount is a control amount calculated based on the operational amount of the maneuvering unit 1, on the assumption of flat terrain travel, that is a travel wherein the target rotational speed becomes the actual rotational speed. The base control amount calculation section 50 includes a left wheel speed calculation section 51 and a right wheel speed calculation section 52. The left wheel speed calculation section 51 calculates the rotational speed (number of rotations) of the left rear wheel 2a, i.e. the rotational speed (torque) of the left wheel motor 21, based on an operational amount via the left steering angle detection sensor 80a for detecting an amount of operation of the left maneuvering lever 1a by the driver. By a similar method, the right wheel speed calculation section 52 calculates the rotational speed (number of rotations) of the right rear wheel 2b, i.e. the rotational speed (torque) of the right wheel motor 22, based on an operational amount via the right steering angle detection sensor 80b for detecting an amount of operation of the right maneuvering lever 1b by the driver. For these calculations, a table or a function representing the relationship between the operational positions and the rotational speeds is employed.

The drive torque calculation section 53 calculates required drive torques (simply "required torques" hereinafter) required for the first drive section 40A and the second drive section 40B. The required torque means an amount of torque required for causing the actual speed to become the target speed in case the actual rotational speed has failed to reach the target rotational speed with the base control amount calculated by the base control amount calculation section 50 based on the target rotational speed set based on the operational amount of the left maneuvering lever 1a or the right maneuvering lever 1b. In case the actual rotational speed has exceeded the target rotational speed, the required torque has a negative value. Therefore, the drive torque calculation section 53 calculates the required torque from the target rotational speed for the right and left rear wheel 2b, 2a calculated by the base control amount calculation section 50 and the actual rotational speed of each of the rear wheels 2*a*, 2*b* obtained by the left rear wheel rotation detection sensor 70*a* and the right rear wheel rotation detection sensor 70*b*.

The correction section 54 corrects, based on the required torques calculated by the drive torque calculation section 53, the base control amounts for the left wheel motor 21 and the right wheel motor 22 obtained by the left wheel speed calculation section 51 and the right wheel speed calculation section 52. The base control amount calculation section 50, the drive torque calculation section 53 and the correction section 54 together constitute a dive wheel control section 5A for generating control amounts for driving the drive wheel unit 2.

The caster wheel control section 5B, in principle, constitutes a functional section which functions at the time of bank traversing travel as described above and includes a steering control section 56 and a drive control section 57. The steering control section 56 calculates control amounts for steering the right and left caster wheels 3*b*, 3*a* to a steering angle based on the vehicle bank degree at that time or commanded by the driver, in case the vehicle bank degree exceeds a predetermined value or a command is given by the driver; and provides the caster wheel steering power supply unit 43 with these control amounts as caster wheel control commands. Similarly, the drive control section 57 calculates control amounts for rotatably driving the right and left caster wheels 3*b*, 3*a* at rotational speeds based on the vehicle bank degree at that time or commanded by the driver, in case the vehicle bank degree exceeds a predetermined value or a command is given by the driver; and provides the caster wheel drive power supply unit 44 with these control amounts as caster wheel control commands.

Figure 6:
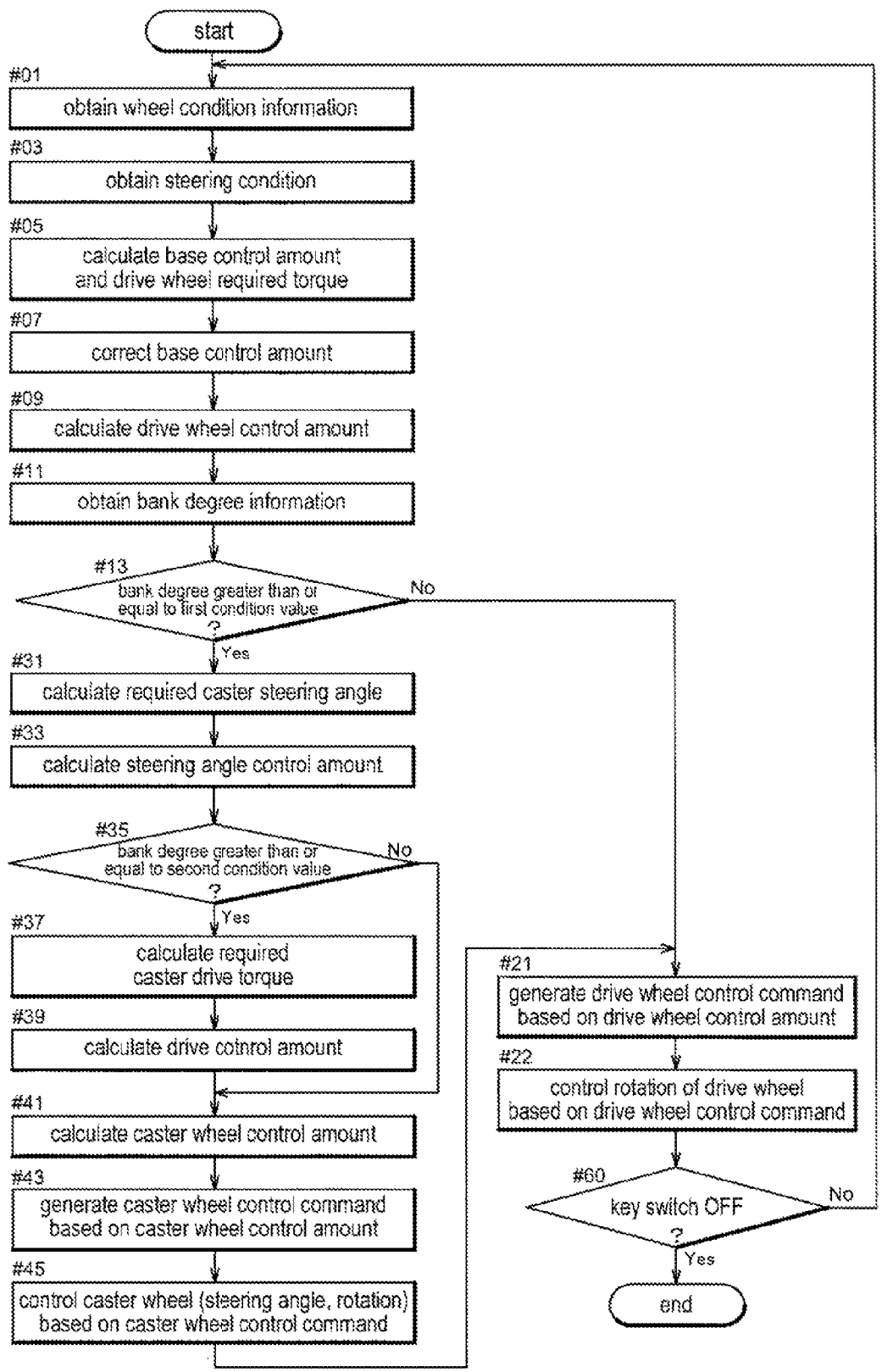
FIG. 6 is a flowchart illustrating a flow of the travel control including the bank traversing travel.

Next, the flow of travel control including the bank traversing travel by the riding electric powered grass mower constructed as described above will be explained with reference to the flowchart of FIG. 6.

When the key switch of the riding electric powered grass mower is turned ON, this control routine is started. First, through the sensor information processing section 59, rotational speeds of the left rear wheel 2*a* and the right rear wheel 2*b* included in the wheel condition information are obtained (#01). Further, the pivotal angle (operational amount) of the left maneuvering lever 1*a* and the pivotal angle (operational amount) of the right maneuvering lever 1*b* are also obtained (#03). Upon obtaining the operational amounts of the right and left maneuvering levers 1*b*, 1*a*, the base control amounts as described above are obtained based on these operational amounts. Each base control amount is the control amount which is to be corrected by the required torque and/or the compensation torque to be described later and then given to the inverter 4. In this, the wheel rotational speed (speed) corresponding to the control amount given from the control unit 5 to the inverter 4 is set as the target rotational speed and this target rotational speed is compared with the obtained rear wheel rotational speed as the actual rotational speed. The amount of the rotational speed shortage of the actual rotational speed falling short of the target rotational speed corresponds to the torque shortage. Therefore, from this target rotational speed and the actual rotational speed, the required torque is calculated (#05). With using this calculated required torque, the base control amount is corrected (#07). And, a drive wheel control amount (speed +torque) as a control amount for each one of the left rear wheel 2*a* and the right rear wheel 2*b* is generated (#09). In particular, torque shortage tends to occur in the case of a hill-climb travel, a rough terrain travel, a travel for heavy load transport. However, the torque shortage is resolved by the correction using this required torque.

Next, the bank degree information is obtained (#11). And, the process checks whether or not the bank degree (bank angle) is greater than a first condition value which is a present predetermined value (#13). This first condition value is a bank degree which requires steering angle control or rotation control of the caster wheel unit 3 for smooth travel at the time of bank traversing travel. If the bank degree is smaller than the first condition value (No branching at #13), forcible control of the caster wheel unit 3 is not needed, so the drive wheel control amount generated at step #09 is sent to the inverter 4 and a dive wheel control command is generated (#21). As this drive wheel control command is set to the left wheel motor 21 and the right wheel motor 22, the left rear wheel 2*a* and the right rear wheel 2*b* are driven (#22).

On the other hand, if the bank degree is equal to or greater than the first condition value (Yes branching at #13), the process calculates a required caster steering angle which is a caster steering angle determined according to the bank degree (#31), and calculates a required caster steering angle required for providing this required caster steering angle (#33). Further, the process checks whether or not the bank degree is greater than a second condition value which is a present predetermined value (#35). This second condition value is a bank degree which requires not only the steering angle control of the caster wheel unit 3, but also the rotation control for rotating the caster wheels in order to realize smooth travel in the bank traversing travel. If the bank degree is equal to or greater than the second condition value (Yes branching at #35), the process calculates a required caster drive torque which is determined according to the bank degree (#37), and calculates a drive control amount required for providing this required caster drive torque (#39).

At step #35, if it is determined that the bank degree is smaller than the second condition value (No branching at #35), the rotation control for the caster wheels is not needed. Hence, the process skips steps #37 and #39.

Next, the process calculates a caster wheel control amount which contains only the steering angle control amount or both the steering angle control amount and a drive control amount, and sends the caster wheel control amount to the inverter 4 (#41). Then, the inverter 4 generates a caster wheel control command from the caster wheel control amount (#43). Based on this caster wheel control command, the drive motors 31*a*, 31*b* for caster wheel rotation drive are driven, as well as the steering motors 32*a*, 32*b* for changing steering angle if needed (#45). Needless to say, the driving of the left rear wheel 2*a* and the right rear wheel 2*b* at the above-described step #21 and step #22 is also effected. Whereby, during a bank traversing travel too, maneuvering with an operational feel similar to that for flat terrain travel is made possible. The series of routine is executed in repetition as long as the key switch is not turned OFF (No branching at #60) and is completed upon turning OFF of the key switch (Yes branching at #60).

Modified Embodiment of First Embodiment (1) In the foregoing embodiment, there is implemented first the method of controlling the steering angle of the caster wheel 3*a*, 3*b* to the predetermined angle in such a manner to resolve the difference in travel direction between the target travel and actual travel which occurs at the time of bank traversing travel and thereafter there is implemented a method, as a supplemental method, of rotatably driving the caster wheels 3a, 3b for outputting the compensation torque for resolving such travel direction difference. Instead of this, the steering angle control and the rotation drive control of the caster wheels 3; 3b can be effected simultaneously from the beginning. Further alternatively, the rotation drive control of the caster wheels 3a, 3b may be effected prior to the steering angle control of the caster wheels 3a, 3b.

(2) In the foregoing embodiment, the inverter control was employed as the motor control. Instead, any other control capable of controlling the speed and torque may be employed.

Figure 7:
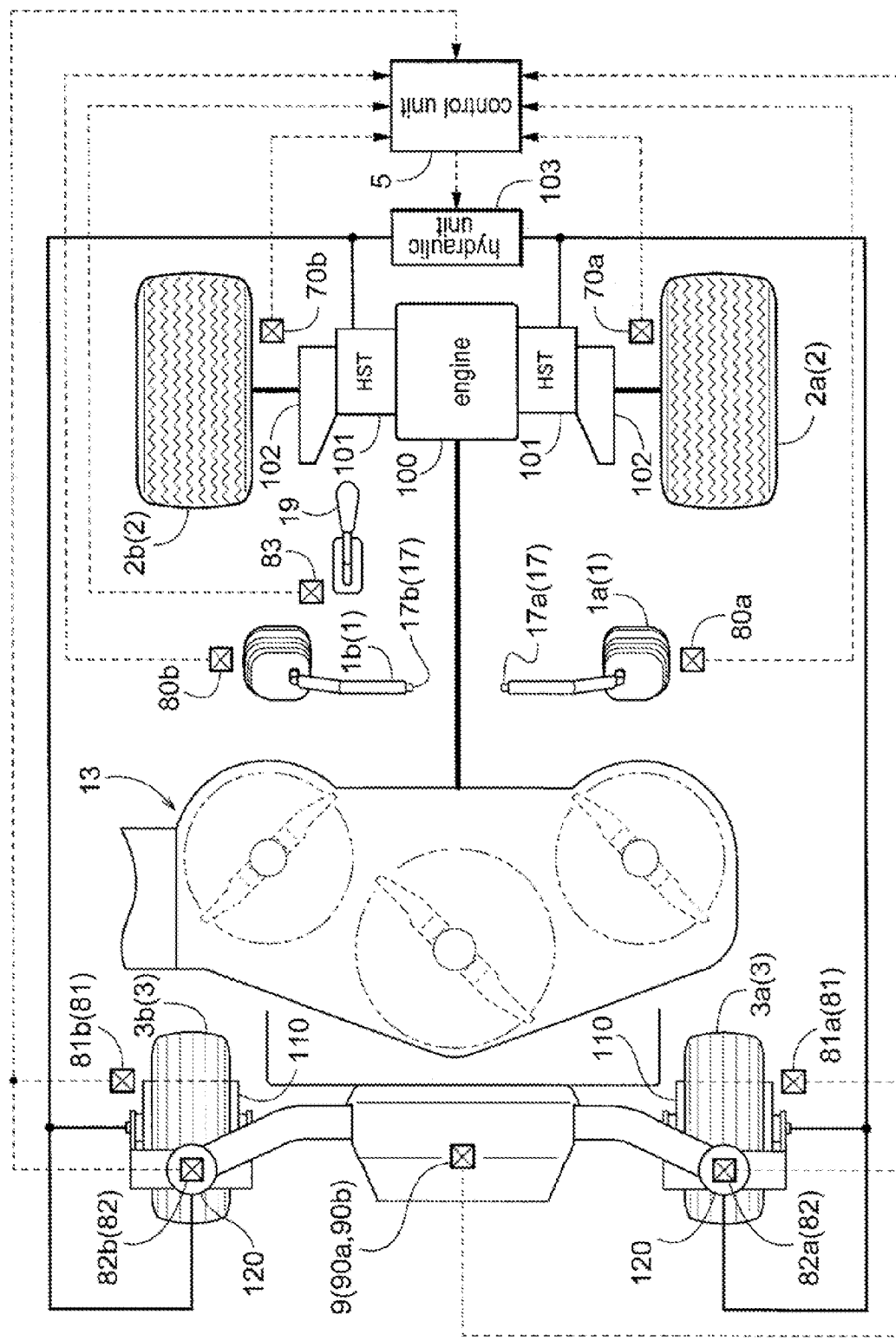
FIG. 7 is a system diagram relating to a further embodiment and corresponding to FIG. 3.

(3) In the foregoing embodiment, the battery 20, the inverter 4 and the electric motors were employed in the driving line for the left rear wheel 2a and the right rear wheel 2b. Instead, as shown in FIG. 7, there may be employed a drive unit which uses the engine 100 as the drive source and transmits a rotational power controlled by a hydraulic unit 103 to the left rear wheel 2a and the right rear wheel 2b via a pair of right and left hydrostatic transmissions (each will be referred to as the "HST" hereinafter) 101 and a pair of right and left transmission mechanisms 102. The HST 101 is capable of stepless speed changing through adjustment of the swash plate angle of a hydraulic pump and/or a hydraulic motor, and each swash plate angle is controlled by the hydraulic unit 103 mounting a servo hydraulic control instrument. Therefore, as to the control unit 5, the control amounts outputted therefrom are provided as control signals suitable for the control instruments of the hydraulic unit 103. But, the basic arrangement thereof will remain the same. Basically, torque control is realized by control of pressure of work oil and speed control is realized by control of the flow rate of the work oil. Therefore, the HST 101 can effect a similar control to that provided by the electric motor used in the foregoing embodiment. In place of the swash plate control by oil pressure, swash plate control using electric power may be employed. In such case, the drive motor 110 for the caster wheel rotation drive and the steering motor 120 for changing their steering angle can be hydraulic motors.

(4) In the foregoing embodiment, for the sake of simplicity in description of the functions of the control unit 5, the base control amount calculation unit 50 for calculating the base control amount, the drive torque calculation section 53 for calculating the required torque, the correction section 54, the steering control section 56, the drive control section 57, etc. were provided separately. However, in the present invention, these functional sections can be integrated or further divided as desired.

Second Embodiment

A second embodiment of the present invention will be described with reference to the accompanying drawings.

Figure 8:
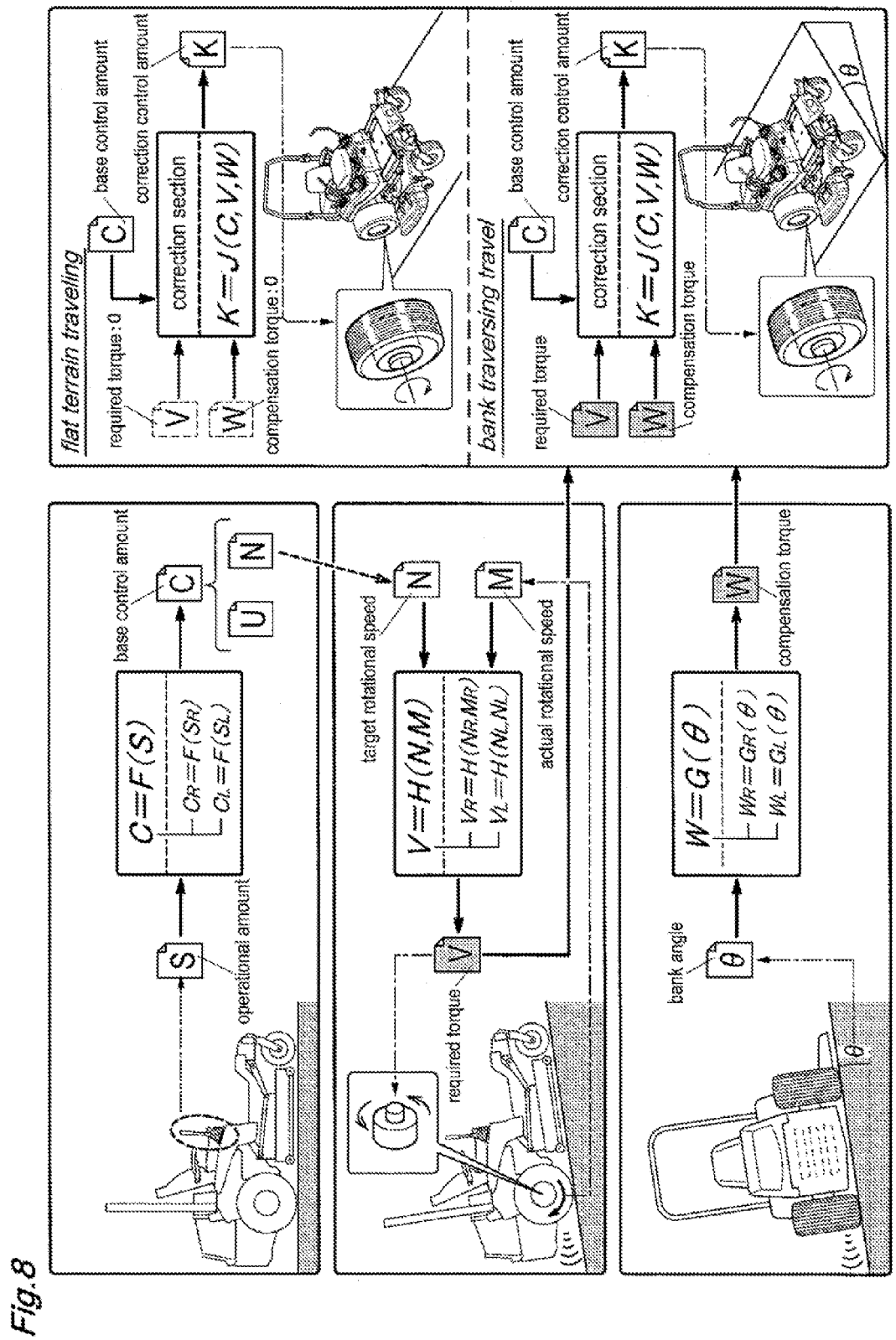
FIG. 8 is a diagram illustrating the basic principle of drive control during a bank traversing travel in a second embodiment.

Before description of specific construction of a self-propelled vehicle according to the second embodiment of the present invention, with reference to FIG. 8, there will be described the basic principle of the caster wheel control during a bank traversing travel which characterizes this second embodiment. In this embodiment too, the self-propelled vehicle includes a pair of right and left drive wheels (rear wheels) driven by electric motors (which will be referred to simply as "motors" hereinafter) as drive wheel units, and a pair of right and left caster wheels as front wheels which can be changed in the steering angles by the motors. Further, this self-propelled vehicle mounts, on its vehicle body, a mower unit which is one example of a utility work implement, and thus the vehicle functions as a riding type electric powered grass mower.

A maneuvering unit operated by the driver outputs an operational amount for driving intended by the driver in the form of sensor detection signals in general. From this operational amount, a control unit generates base control amounts for controlling the right drive wheel motor and the left drive wheel motor. And, as the motors are driven based on these base control amounts, predetermined rotational speeds (speeds) and torques are generated in the respective drive wheels. For this reason, in the following discussion, it is assumed that the base control amount includes a torque: U and a speed: N. Derivation of the base control amount from the operational amount of the maneuvering unit is done through a map which tabulates relationship therebetween. Assuming S denotes the operational amount and C denotes the base control amount, the relational expression (map table): F can be represented as follows.

$$C=F(S)$$

As the pair of right and left rear wheels are controlled independently of each other, the above expression can be represented as CL=F(SL) for the left rear wheel line and as CR=F(SR) for the right rear wheel line, respectively.

In a hill-climbing travel or a rough terrain travel, there is the possibility of torque shortage wherein the torque generated by the base control amount falls short of the torque required for the travel intended by the driver. This torque shortage, that is, the required drive torque required for normal drive (which will be referred to simply as "required torque" hereinafter): V can be derived as follows with using a required relational expression: H from a target rotational speed: N included in the base control amount and an actual rotational speed: M which is the rotational speed obtained from a rotational speed detection sensor.

$$V=H(N,M)$$

With correction of the control amount by addition of this required torque thereto, traveling without torque shortage is realized.

Further, in the case of a bank traversing travel, an inclinedly downward force is applied to the wheels. Therefore, it is necessary to correct the control amount so as to add a compensation torque for canceling this out. To this end, the relationship for deriving the required caster steering angle with using the vehicle bank degree as the input parameter is constructed in advance through experiments and learning the results of the experiments. For simplicity of the explanation, it is assumed that the vehicle is to traverse an bank surface horizontally and the bank degree is the rolling degree of the vehicle, that is, bank angle:θ. Then, the relational expression: G for deriving the compensation torque: W is represented as follows.

$$W=G(\theta).$$

If this compensation torque is provided respectively to the right and left rear wheels, then, we obtain:

$$WL=GL(\theta), WR=GR(\theta)$$

With correction of the control amount with addition of this compensation torque thereto, even in an inclinedly traverse travel, the inclinedly downward force applied to the wheels is restricted and the maneuverability is improved.

Therefore, the correction section generates a correction control amount by correcting the base control amount based on the required torque and the compensation torque. The correction expression: J used in this correction section is for deriving the correction control amount: K with using the base control amount: C, the required torque: V and the compensation torque: W as input parameters and can be represented as follows.

$$K=J(C,V,W)$$

At the time of a flat terrain travel wherein the vehicle travels on a flat terrain with less traveling resistance, the required torque: V=0, the compensation torque: W=0; therefore, the correction control amount: K becomes equal to the base control amount C.

On the other hand, at the time of bank traversing travel, there is generated the correction control amount: K with addition of the compensation torque: W thereto and also addition of the required torque: V thereto, and based on this correction control amount: K, the rear wheel is driven and controlled. In this, the compensation torque: W can be provided separately to the right and left rear wheels. For instance, it is possible to employ a method of applying a negative compensation torque to one wheel and applying a positive compensation torque to the other wheel.

Figure 9:
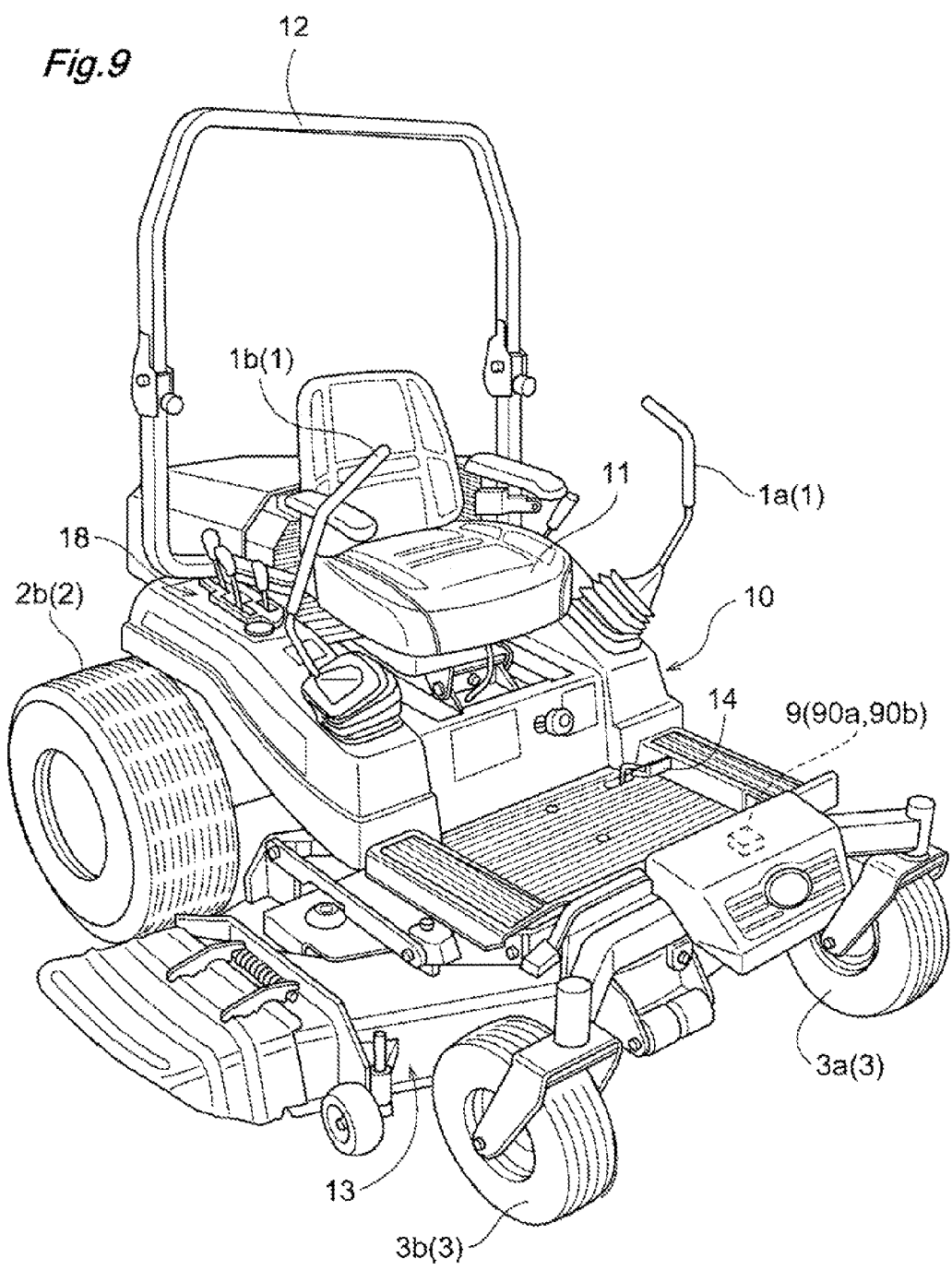
FIG. 9 is a perspective view showing a riding type electric powered grass mower which is one example of self-propelled vehicle in the second embodiment.
Figure 10:
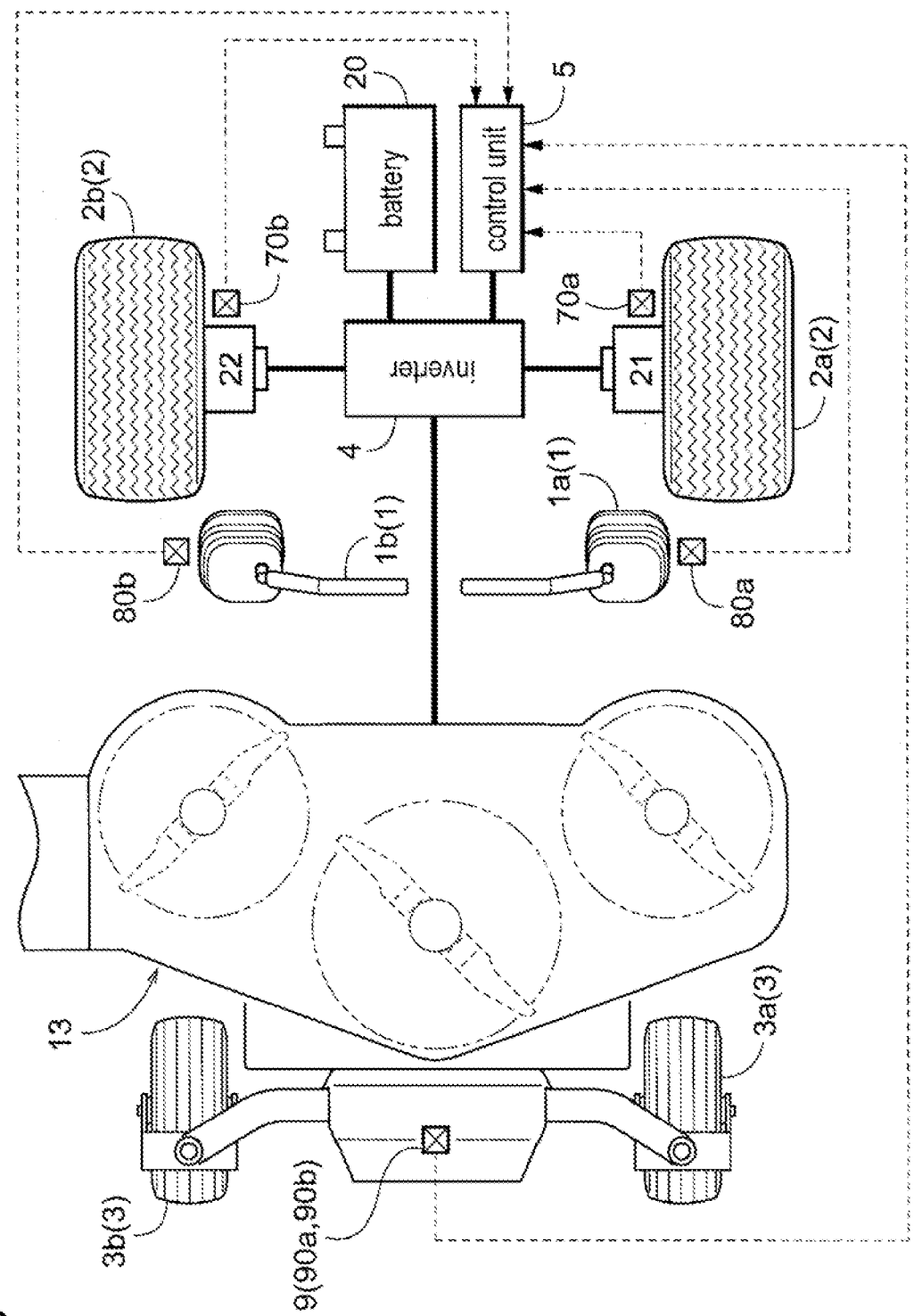
FIG. 10 is a system diagram showing an electric line system and a power line system of the riding type electric powered grass mower.

Next, there will be described a specific construction of a self-propelled vehicle implementing the above-described drive control principle at the time of bank traversing travel. As shown in FIG. 9 and FIG. 10, in this case too, the self-propelled vehicle is constructed as a riding type electric powered grass mower. The vehicle includes a maneuvering unit 1 operated by a driver, a control unit 5 for generating a control amount based on an operational amount of the maneuvering unit 1, a drive unit having a first drive section 40A and a second drive section 40B that are driven and controlled independently of each other by control commands, and a rear wheel unit having a left drive wheel 2a driven for traveling by the first drive section 40A and a right drive wheel 2b driven for traveling by the second drive section 40B. Changing of the traveling direction of the vehicle is realized by a rotation difference and/or a drive torque difference between the left drive wheel 2a and/or the right drive wheel 2b. A caster wheel unit 3 consists of a pair of freely rotatable right and left caster wheels 3b, 3a.

The general appearance of the riding electric powered grass mower is shown in the perspective view of FIG. 9. And, its electric line system and the power line system are diagrammatically shown in FIG. 10. As may be understood from FIG. 9, this riding electric powered grass mower includes a vehicle body 10 supported by the caster wheel unit 3 and the rear wheel unit 2, a battery 20 mounted at a rear portion of the vehicle body 10, a driver's seat 11 disposed forwardly of the battery 20, a rollover protection frame 12 mounted erect rearwardly of the driver's seat 11, and a mower unit 13 suspended from the vehicle body 10 to be lifted up/down by a lift link mechanism in the space downwardly of the vehicle body 10 and between the caster wheel unit 3 and the drive wheel unit 2. Electric power supply to the drive wheel unit 2 and the mower unit 13 is effected via an inverter 4 which is operated under control by the control unit 5 which is referred to also as an ECU.

Forwardly of the driver's seat 11, there is provided a floor plate which serves as a foot rest for the driver. From this, a brake pedal 14 projects. On the opposed sides of the driver's seat 11, there is provided a maneuvering unit 1 consisting of a left maneuvering lever 1a and a right maneuvering lever 1b which are pivotable about a horizontal pivot axis extending along the traverse direction of the vehicle body. Further, on one side of the driver's seat, 11, in this case, on the left side thereof, there is provided an electric operational panel 18 including switch buttons, switch levers, etc. of the electric control line.

Figure 11:
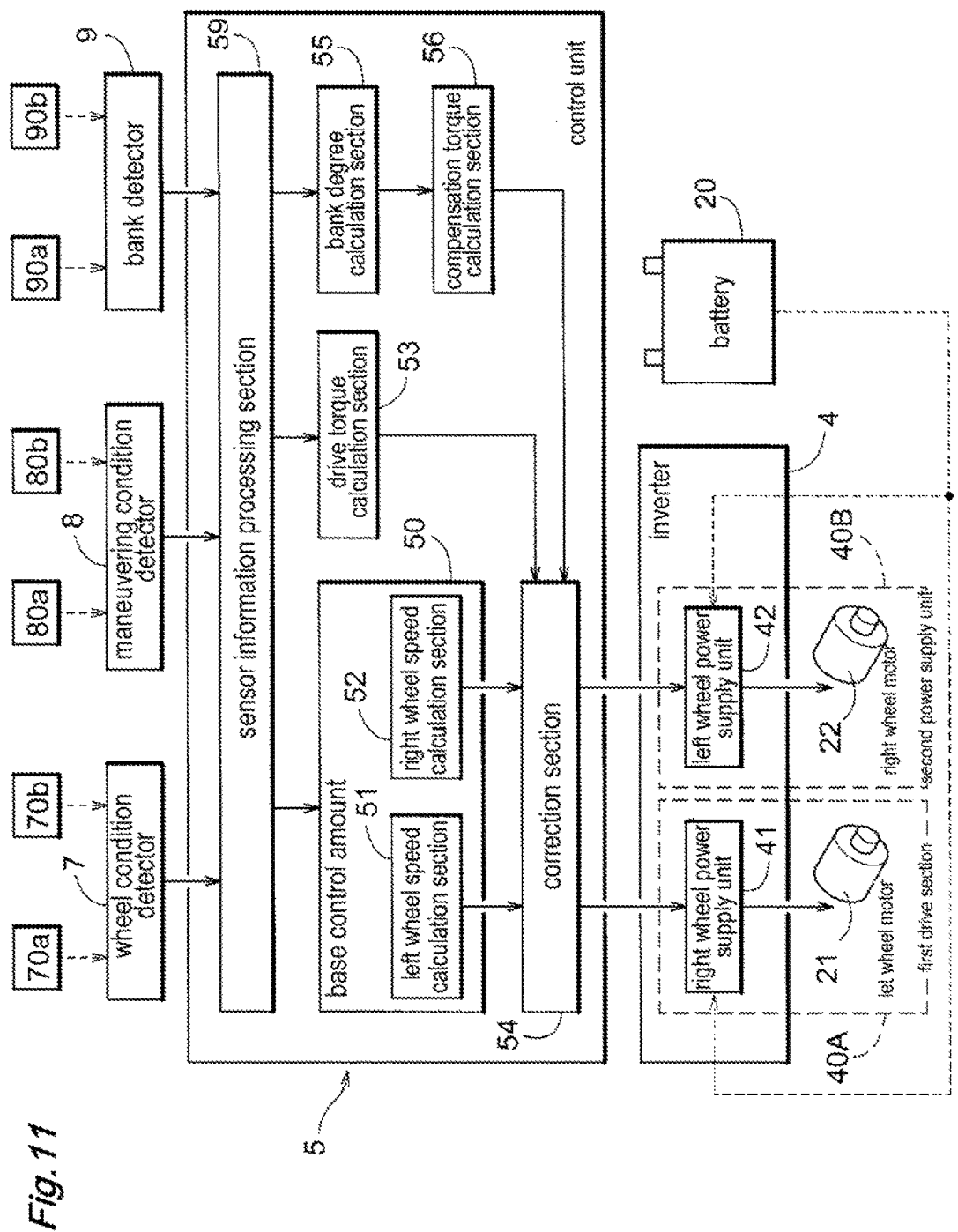
FIG. 11 is a functional block diagram of a control unit.

In this embodiment, the left rear wheel 2a and the right rear wheel 2b depend respectively on the left wheel motor 21 and the right wheel motor 22 which are constituted as in-wheel motors, as the respective drive sources thereof. As shown in FIG. 11, the rotational speed and/or the torque respectively of the left wheel motor 21 and the right wheel motor 22 are/is varied by the electric power supplied independently from a left wheel power supply unit 41 and a right wheel power supply unit 42 each of which is constructed as an inverter 4. Hence, the rotational speeds (circumferential speeds) of the left rear wheel 2a and the right rear wheel 2b can be made different from each other and, with this speed difference between the right and left rear wheels, a turning of the riding electric powered grass mower is effected. That is, in this embodiment, a first drive section 40A consists of the left wheel power supply unit 41 and the left wheel motor 21, and a second drive section 40B consists of the right wheel power supply unit 42 and the right wheel motor 22. Namely, in this embodiment, the drive unit consists of the left wheel power supply unit 41 and the right wheel power supply unit 42 which are comprised of inverters, and the left wheel motor 21 and the right wheel motor 22 which are comprised of electric motors.

The power (control amount) outputted respectively from the left wheel power supply unit 41 and the right wheel power supply unit 42 corresponds to a target rotational speed (target speed) calculated by the control unit 5. In this, when the actual rotational speed (actual speed) becomes smaller than the target due to the traveling load, the control amount is corrected so as to increase the motor output torque. Further, the control unit 5 calculates the compensation torque to create a condition pseudo-equivalent to the condition of a flat terrain travel by canceling out the downward force applied to the wheel positioned on the down side of the bank surface occurring at the time of bank traversing travel. And, a control amount taking this compensation torque is given to the left wheel motor 21 and the right wheel motor 22.

Incidentally, though not shown, power supply to a blade motor for grass mowing accommodated in the mower unit 13 is also effected via the inverter 4.

As shown in FIG. 11, the control unit 5 is connected to a wheel condition detector 7, a maneuvering condition detector 8 and a bank detector 9 as input devices; and connected to the inverters 4 as the output devices.

The wheel condition detector 7 includes various sensors for obtaining information relating to traveling, such as a left rear wheel rotation detection sensor 70a for detecting a rotational speed (wheel condition information) of the left rear wheel 2a, a right rear wheel rotation detection sensor 70b for detecting a rotational speed (wheel condition information) of the right rear wheel 2b, and so on. The maneuvering condition detector 8 includes various sensors for obtaining information relating to maneuvering, such as a left maneuvering angle detection sensor 80a for detecting a pivotal angle (maneuvering condition information) of the left maneuvering lever 1a, a right maneuvering angle detection sensor 80b for detecting a pivotal angle (maneuvering condition information) of the left maneuvering lever 1a, a brake detection sensor for detecting a pivotal angle of the brake pedal 14. The bank detector 9 includes a first sensor 90a for detecting a bank angle (bank degree information) about a vehicle longitudinal axis and a second bank sensor 90b for detecting a bank angle (bank degree information) about a vehicle transverse axis. Based on detection values of the first bank sensor 90a and the second bank sensor 90b, an inclinedly downward force component applied to the wheel during a bank traversing travel can be obtained. For the sake of convenience of the calculation, it may be assumed that a vehicle is effecting a bank traversing travel even when it is actually traveling obliquely on the bank surface and the bank degree of this vehicle is represented with normalization. Further, as this assumption renders the explanation simple also, in the following discussion, it is assumed that the bank degree discussed below is normalized to a bank degree in the bank traversing travel.

In the control unit 5, a base control amount calculation section 50, a drive torque calculation section 53, a correction section 54, a bank degree calculation section 55, a compensation torque calculation section 56, a sensor information processing section 59, etc. are configured by execution of programs. However, these sections can also be configured as hardware if necessary.

The bank degree calculation section 55 calculates a bank degree of the vehicle based on detection signals from the above-described bank detector 9. The sensor information processing section 59 processes sensor signals inputted from the wheel condition detector 7, the maneuvering condition detector 8 and the bank detector 9, and converts them into the information usable inside the control unit 5.

The base control amount calculation section 50 has the function of calculating base control amounts for the left wheel motor 21 and the right wheel motor 22 based on an operational amount of the maneuvering unit 1. Each base control amount is a control amount calculated based on the operational amount of the maneuvering unit 1, on the assumption of flat terrain travel, that is, a travel wherein the target rotational speed becomes the actual rotational speed. The base control amount calculation section 50 includes a left wheel speed calculation section 51 and a right wheel speed calculation section 52. The left wheel speed calculation section 51 calculates the rotational speed (number of rotations) of the left rear wheel 2a, i.e. the rotational speed (torque) of the left wheel motor 21, based on an operational amount via the left steering angle detection sensor 80a for detecting an amount of operation of the left maneuvering lever 1a by the driver. By a similar method, the right wheel speed calculation section 52 calculates the rotational speed (number of rotations) of the right rear wheel 2b, i.e. the rotational speed (torque) of the right wheel motor 22, based on an operational amount via the right steering angle detection sensor 80b for detecting an amount of operation of the right maneuvering lever 1b by the driver. For these calculations, a table or a function representing the relationship between the operational positions and the rotational speeds is employed.

The drive torque calculation section 53 calculates required drive torques (simply "required torques" hereinafter) required for the first drive section 40A and the second drive section 40B. Each required torque means an amount of torque required to the left wheel motor 21 or the right wheel motor for causing the actual speed to become the target speed, in case the actual rotational speed has failed to reach the target rotational speed with the base control amount which is calculated by the base control amount calculation section 50 based on the target rotational speed set based on the operational amount of the left maneuvering lever 1a or the right maneuvering lever 1b. In case the actual rotational speed has exceeded the target rotational speed, the required torque has a negative value. Therefore, the drive torque calculation section 53 calculates the required torque from the target rotational speed for the right and left rear wheel 2b, 2a calculated by the base control amount calculation section 50 and the actual rotational speed of each of the rear wheels 2b, 2a obtained by the left rear wheel rotation detection sensor 70a and the right rear wheel rotation detection sensor 70b.

Under the vehicle posture during the bank traversing travel, an inclinedly downward force is applied to the wheel positioned on the down side of the bank. Therefore, there tends to occur a difference of travel direction between the target travel corresponding to the operation of the left maneuvering lever 1a or the right maneuvering lever 1b and the actual travel. In order to resolve such direction difference between the target travel direction and the actual travel direction at the time of such a bank traversing travel, an additional torque (this can be a negative torque) may be applied to either one or both of the left rear wheel 2a and the right rear wheel 2b which torque will cancel out the slip-down force. The compensation torque calculation section 56 calculates, as the compensation torque, a torque additionally applied for resolving such difference of vehicle direction due to the bank.

By additionally providing a control amount corresponding to the compensation torque calculated as above to the left wheel power supply unit 41 and/or the right wheel power supply unit 42, the compensation torque is generated in the left wheel motor 21 and/or the right wheel motor 22 which compensation torque compensates for the direction difference between the target travel direction and the actual travel direction at the time of the bank traversing travel. With this, the adverse influence of the vehicle posture at the time of bank traversing travel to the maneuverability can be eliminated.

Incidentally, a compensation torque calculation algorithm differs depending on the traveling characteristics and the maneuvering characteristics of the vehicle, so it is difficult to construct a quantitative relational expression. For this reason in this embodiment, the compensation torque calculation section 56 effects the statistical processing on data, which data are obtained by repeated experiments for obtaining the compensation torque with using the vehicle bank degree at the time of the bank traversing travel as the input parameter for each vehicle type, thus constructing a compensation torque deriving table. In actuality, with production of a bank degree/compensation torque deriving table as a table for deriving a compensation torque from a bank degree, a compensation torque calculation which is simple, yet speedy and accurate is made possible.

Also, in the calculation of the compensation torque, the vehicle weight, in particular the vehicle weight balance, will be an important factor. Accordingly, in the case of a grass mower having a grass collecting container or a vehicle used also for load transport with which the vehicle weight or the vehicle weight balance varies at each time of traveling, the distribution value of the vehicle weight should be used as another input parameter. For this vehicle weight distribution value, there may be additionally provided as another vehicle condition detector, e.g. sensors for detecting the load applied to the respective wheels; and the calculation may be made based on detection values from these sensors. In this, the compensation torque calculation section 56 may construct in advance a bank degree/compensation torque deriving table for each vehicle weight distribution value, so that a bank degree/compensation torque deriving table, which is suited to a vehicle weight distribution value contained in the wheel condition information, may be selectively set.

The correction section 54 corrects the base control amounts for the left wheel motor 21 and the right wheel motor 22 obtained by the left wheel speed calculation section 51 and the right wheel speed calculation section 52, based on the required torque calculated by the drive torque calculation section 53 and/or the compensation torque calculated by the compensation torque calculation section 56.

Figure 12:
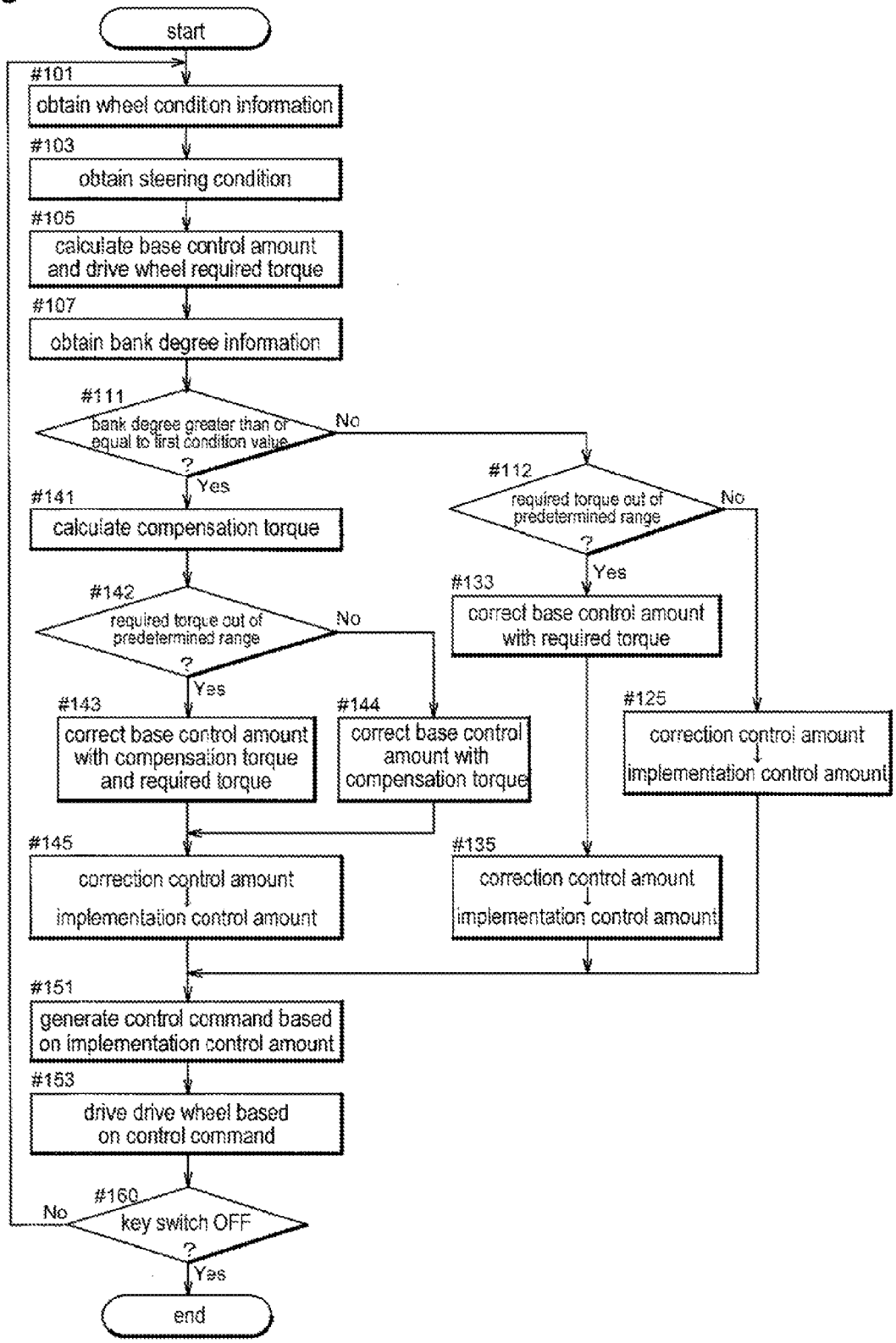
FIG. 12 is a flowchart illustrating a flow of the travel control including a bank traversing travel.

With reference to the flowchart in FIG. 12, the flow of travel control will be described next, including the control for the bank traversing travel by the riding electric powered grass mower constructed as described above.

When the key switch of the riding electric powered grass mower is turned ON, this control routine is started. First, through the sensor information processing section 59, rotational speeds of the left rear wheel 2*a* and the right rear wheel 2*b* included in the wheel condition information are obtained (#101). Further, the pivotal angle (operational amount) of the left maneuvering lever 1*a* and the pivotal angle (operational amount) of the right maneuvering lever 1*b*, which pivotal angles (operational amounts) are included in the steering condition information, are also obtained (#103). Upon obtaining the operational amounts of the right and left maneuvering levers 1*b*, 1*a*, the base control amounts as described above are obtained based on these operational amounts. Each base control amount is the control amount which is to be corrected by the required torque and/or the compensation torque to be described later and then given to the inverter 4. In this, the wheel rotational speed (speed) corresponding to the control amount given from the control unit 5 to the inverter 4 is set as the target rotational speed, and this target rotational speed is compared with the obtained rear wheel rotational speed as the actual rotational speed. The amount of the rotational speed shortage of the actual rotational speed falling short of the target rotational speed corresponds to the torque shortage. Therefore, the required torque is calculated from the target rotational speed and the actual rotational speed (#105).

Next, the bank degree information is obtained (#107). And, the process checks whether or not the bank degree (bank angle) is greater than a present predetermined value (#111). If the bank degree is smaller than the predetermined value (No branching at #111), the process further checks whether the required torque calculated in advance is within a predetermined range or not (#112). This predetermined range represents a range where the derived torque shortage is negligible. Therefore, if the required torque is within the predetermined range (No branching at #112), it may be determined that the current travel is e.g. a flat terrain travel with less traveling resistance. Accordingly, the base control amount is outputted as it is as the control amount to be actually implemented (#125). That is, the correction of the base control amount by the correction section 54 is not effected.

On the other hand, if the checking at step #112 indicates that the required torque is out of the predetermined range (Yes branching at #112), it is determined that torque shortage exists due to a hill-climbing travel, a rough terrain travel or a heavy load transporting travel, etc. Hence, the base control amount is corrected based on the required torque (#133). Then, the corrected base control amount is outputted as the control amount to be actually implemented (#135).

With reference back to the checking at step #111, if it indicates that the bank degree is equal to or greater than the predetermined value (Yes branching at #111), then, there is a need for effecting the torque compensation for restricting slipping-off of the wheel at the time of the bank traversing travel. Therefore, this compensation torque is calculated based on the bank degree (#141). The process further checks whether the required torque is not confined within the preset predetermined range (#142). If it is determined that the required torque is out of the predetermined range (Yes branching at #142), then, the base control amount is corrected based on both the compensation torque and the required torque (#143). Whereas, if it is determined that the required torque is not out of the predetermined range (No branching at #142), the base control amount is corrected based on the compensation torque alone (#144). In whichever case, the corrected base control amount is outputted as the control amount to be actually implemented (#145).

Figure 13A:
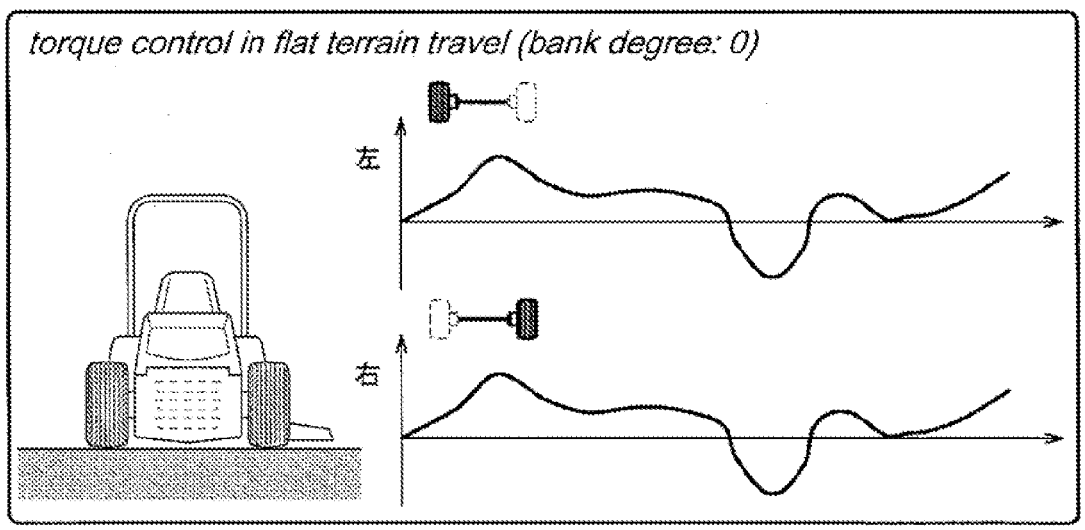
FIG. 13A is an explanatory view showing torque control in a flat terrain travel.
Figure 13B:
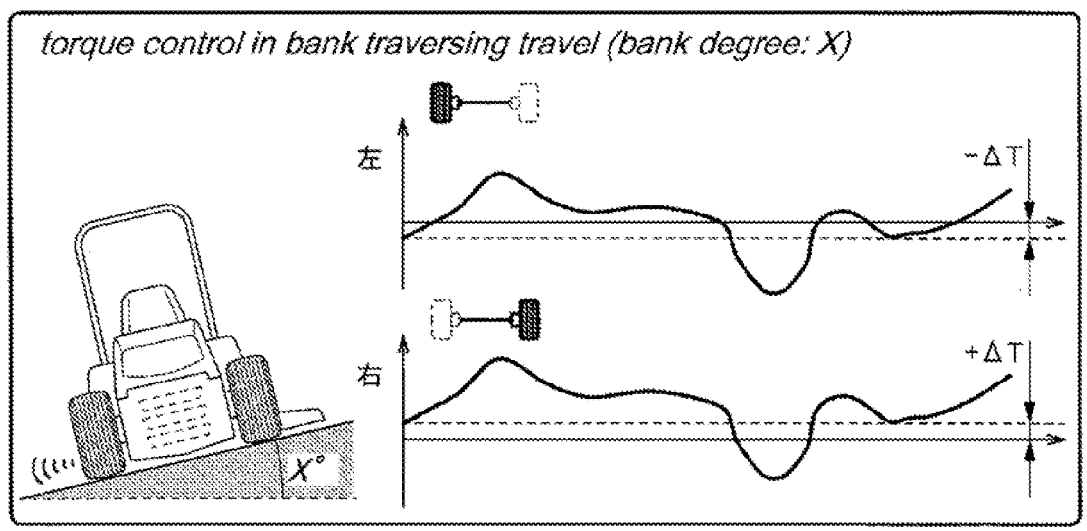
FIG. 13B is an explanatory view showing torque control in the bank traversing travel.

The compensation torque is a torque to be additionally applied to the left drive wheel 2*a* and/or the right drive wheel 2*b* in order to provide the force for offsetting the inclinedly downward force applied to the right caster wheel 3*b* and the left caster wheel 3*a* at the time of the bank traversing travel. Incidentally, a difference between the target rotational speed (target speed) and the actual rotational speed (actual speed) of the right and left drive wheels 2*b*, 2*a* due to the ground surface condition is resolved by the required torque. Therefore, this compensation torque resolves a difference between the target travel direction corresponding to the operational amount of at the time of the bank traversing travel, and the actual travel direction. As the magnitude of this compensation torque varies depending on the bank degree (bank angle), there is prepared a table which allows derivation of a compensation torque from a bank degree. FIGS. 13A and 13B show the modes of torque to be applied to the right and left drive wheels 2*b*, 2*a*, in the case of traveling on a flat terrain (bank angle=0) (FIG. 13A) and the case of traverse traveling on an included surface having a bank angle: X° (FIG. 13B). In FIG. 13A, the right and left drive wheels 2*b*, 2*a* are acceleration/deceleration controlled similarly, based on the zero torque value, thus showing a flat terrain straight travel. On the other hand, in FIG. 13B, in order to cancel out the inclinedly downward force (right side of the vehicle body) occurring in the caster wheels 3*a*, 3*b*, $-\Delta T$ is applied to the left drive wheel 2*a* and $+\Delta T$ is applied to the right drive wheel 2*b*, as the compensation torques, respectively. Whereby, even in the bank traversing travel, maneuvering is made possible with a maneuvering feel similar to that in a flat terrain traveling.

The implemented control amount (control amount to be actually implemented) outputted from the control unit 5 is processed by the inverter 4, and a control command for the left wheel motor 21 is generated in the left wheel power supply unit 41 and a control command for the right wheel motor 22 in the right wheel power supply unit 42 (#151). Based on these control commands, the left wheel motor 21, i.e. the left drive wheel 2*a*, and the right wheel motor 22, i.e. the right drive wheel 2*b*, are driven respectively (#153).

This series of routine is executed repeatedly as long as the key switch is not turned OFF (No branching at #160), and completed upon turning OFF of the key switch (Yes branching at #160).

Modified Embodiment of Second Embodiment (1) In this second embodiment also, the drive unit is constituted of the left wheel power supply unit 41 and the right wheel power supply unit 42 which are inverters, and the left wheel motor 21 and the right wheel motor 22 which are electric motors. Alternatively, as shown in FIG. 7 which is referenced in the first embodiment, there may be employed a drive unit in which the engine 100 is used as the drive source and transmits a rotational power controlled by a hydraulic unit 103 to the left rear wheel 2a and the right rear wheel 2b via a pair of right and left hydrostatic transmissions (each will be referred to as the "HST" hereinafter) 101 and a pair of right and left transmission mechanisms 102.

(2) In the foregoing embodiment, for the sake of simple description of the functions of the control unit 5, the base control amount calculation unit 50 for calculating the base control amount, the drive torque calculation section 53 for calculating the required torque, the correction section 54 for calculating the compensation torque, etc. are provided separately. However, in the present invention, these functional sections can be integrated or further divided as desired.

Third Embodiment

First, the technical object achieved by a grass mower relating to the third embodiment of the present invention will be described with reference to FIG. 21.

For instance, when the vehicle climbs a sloping ground surface, a large torque for a relatively low speed is required, compared with traveling on a flat terrain. When the vehicle is traveling as climbing on such a sloping ground surface and the driver commands via the maneuvering unit 1 increasing of the target speed to the left or right electric motor 21 or 22 in order to turn the vehicle, the desired turning travel may not be effected.

Figure 21:
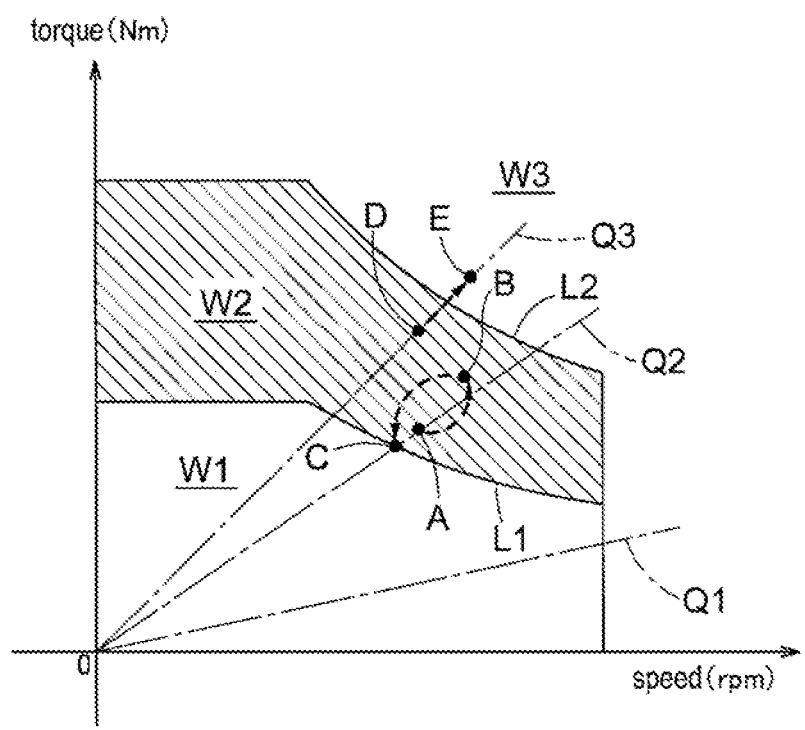
FIG. 21 is a view for explaining the change characteristics of speed torque.

Further description will be given with reference to the speed torque characteristics of the electric motors 21, 22 as shown in FIG. 21.

The electric motors 21, 22 each has the characteristics that the drive torque which can be outputted by the motor is large when the rotational speed is low, but the drive torque that can be outputted is restricted to a relatively a small value when the rotational speed becomes high. In FIG. 21, the region shown downwardly of a line L1 represents the rated range W1 where the electric motor 21, 22 can be operated continuously. And, in the area above this rated range W1, there is provided a short period operation possible range W2 (shown with diagonal lines) wherein the motor can be operated only during lapse of a predetermined period. Moreover, in the area above the line L2, there is an output impossible range W3 wherein the electric motor 21, 22 is unable to output even for a short period of time.

If a control command speed and a control command drive torque are commanded based on the information from the maneuvering unit 1 within the short period operation possible range W2, the motor operation is possible only until the lapse of the predetermined period. Hence, the electric motor 21, 22 will be driven by the control command speed and the control command drive torque corresponding to command information of the maneuvering unit 1.

In the case of a low load work such as a flat terrain traveling, indicated by the load characteristics line Q1 in FIG. 21, regardless of the speed of the control command speed, the required control command drive torque can be outputted. However, in the case of a high load work such as a traveling on a sloping surface indicated by the load characteristics lines Q2, Q3, in accordance with the variation of the control command speed, the control command drive torque that can be outputted will have a different value.

For instance, let us now suppose the control command speed and the control command drive torque commanded for one electric motor 21 or 22 are represented by the point (A) in FIG. 21 and the control command speed and the control command drive torque commanded for the other electric motor 22 or 21 are represented by the point (B) in FIG. 21. This condition corresponds to a turning traveling condition in which the right and left traveling speeds are different from each other. And, until lapse of the predetermined period after the issuance of these command information (point A and point B), the pair of electric motors 21, 22 are driven by these commanded control command speeds and control command drive torques, so that the desired turning condition at the desired speed can be obtained. However, after the lapse of the predetermined period from the issuance of the above command information (point A and point B), the control command speeds to be commanded and control command drive torques to be commanded are forcibly changed and adjusted to the point C within the rated range in order to protect against the overload condition. With this, the speed values of the right and left electric motors 21, 22 become equal to each other, so that the turning traveling intended by the driver becomes impossible.

Further, not only the case of the commanding of the short period operation possible range W2, but also the case of commanding of the point E in the output impossible range W3 for either one of the electric motors 21, 22, the control command speed and the control command drive torque will be restricted to the upper limit values of the short period operation possible range W2, so the turning traveling intended by the driver is not possible. Incidentally, in the case of the arrangement having the short term operation possible range W2, too, after the lapse of the predetermined period, forcible changing adjustment back to the rated range W1 will be effected.

In short, with the conventional arrangement, in case a control command speed and a control command drive torque are commanded in the output restricted range exceeding the rated range (i.e. the short period operation possible range or the output impossible range as described above), there is the risk that the turning traveling intended by the driver becomes impossible.

With the self-propelled vehicle according to this third embodiment, the turning traveling intended by the driver is made possible even in case a control command speed and a control command drive torque are issued in the output restricted range exceeding the rated range, based on information from the maneuvering unit 1.

With reference to the accompanying drawings, the specific construction of the grass mower according to the third embodiment of the present invention will be described hereinafter.

As shown in FIG. 14 and FIG. 15, this grass mower includes a vehicle body 10 having a pair of right and left front wheels 3b, 3a constructed as caster wheels (a front wheel unit or caster wheel unit 3) and a pair of right and left rear wheels 2b, 2a constructed as traveling devices which are rotatably driven (a rear wheel unit or drive wheel unit 2); and a mower unit 13 for cutting grass in association with traveling of the vehicle body 10. The mower unit 13 is supported and suspended from the bottom of the vehicle body 10 between the front and rear wheels via a link mechanism comprising a four-link mechanism, so that the mower unit 13 can be lifted up/down as contacting and following the ground surface by means of ground contact wheels 6 while maintaining the horizontal posture.

The mower unit 13 includes a downwardly open cutter blade housing 13a which is formed to extend downwardly from the top face and the perimeter of the top face of the mower unit. And, inside this cutter blade housing 13a, three rotary cutter blades 13b which are rotatably driven about respective vertical axes are supported and arranged in a triangle layout as seen in the plan view with the center portion thereof being slightly offset toward the forward side. And, upwardly of each rotary cutter blade 13b, there is provided a cutter blade electric motor 13c for rotatably driving each rotary cutter blade 13b. Each rotary cutter blade 13b is rotatably driven by each cutter blade electric motor 13c.

As shown in FIG. 14 and FIG. 15, a driver's seat 11 is provided at the fore/aft center portion of the vehicle body 10, and downwardly of this driver's seat 11, there are provided in right-left juxtaposition a pair of right and left traveling electric motors 22, 21 which drive the pair of right and left rear wheels 2b, 2a independently of each other. Further, a pair of right and left maneuvering levers 1b, 1a are disposed on the right and left sides of the driver's seat 11 to be pivotable back and forth to be manually operable independently of each other for effecting speed changing operations of the right and left rear wheels 2b, 2a. As the pair of right and left traveling electric motors 22, 21 are speed-changed independently by the maneuvering levers 1b, 1a, the right and left rear wheels 2b, 2a are speed-changed in the forward or reverse direction independently of each other.

Adjacent the right and left rear wheels 2b, 2a driven by the pair of right and left traveling electric motors 22, 21, there are mounted brakes B for braking the right and left rear wheels 2, respectively. The brakes B are mechanically coupled with the brake pedal 14 such that the right and left rear wheels 2b, 2a are braked in response to an operation of the brake pedal 14 provided on the driving section step.

When the right and left rear wheels 2b, 2a are constantly driven at a same speed in the forward direction, a straight forward traveling is possible. When the right and left rear wheels 2b, 2a are driven together at a same speed in the reverse direction, a straight reverse traveling is possible. Further, by differentiating the speeds of the right and left rear wheels 2b, 2a from each other, the vehicle 10 can be turned to a desired direction. For instance, by driving either one of the right and left rear wheels 2b or 2a at a low speed near the zero speed and driving the other rear wheel 2a or 2b at a high speed or in the forward or reverse direction, a small turn is possible. Furthermore, by driving the right and left rear wheels 2b, 2a in opposite directions, the vehicle can be spin-turned with substantially the center between the right and left rear wheels 2b, 2a being the pivotal center.

Since the pair of right and left front wheels 3b, 3a are constructed as caster wheels, the directions thereof can be freely changed about the vertical respective axes so that the orientations thereof will be adjusted according to the direction of traveling provided by the driving of the right and left drive wheels 2b, 2a.

As shown in FIG. 14, there is mounted a battery 20 at a rear portion of the vehicle body 10 for supplying driving electric power to the respective cutter blade electric motors 13c and the traveling electric motors 21, 22.

Figure 16:
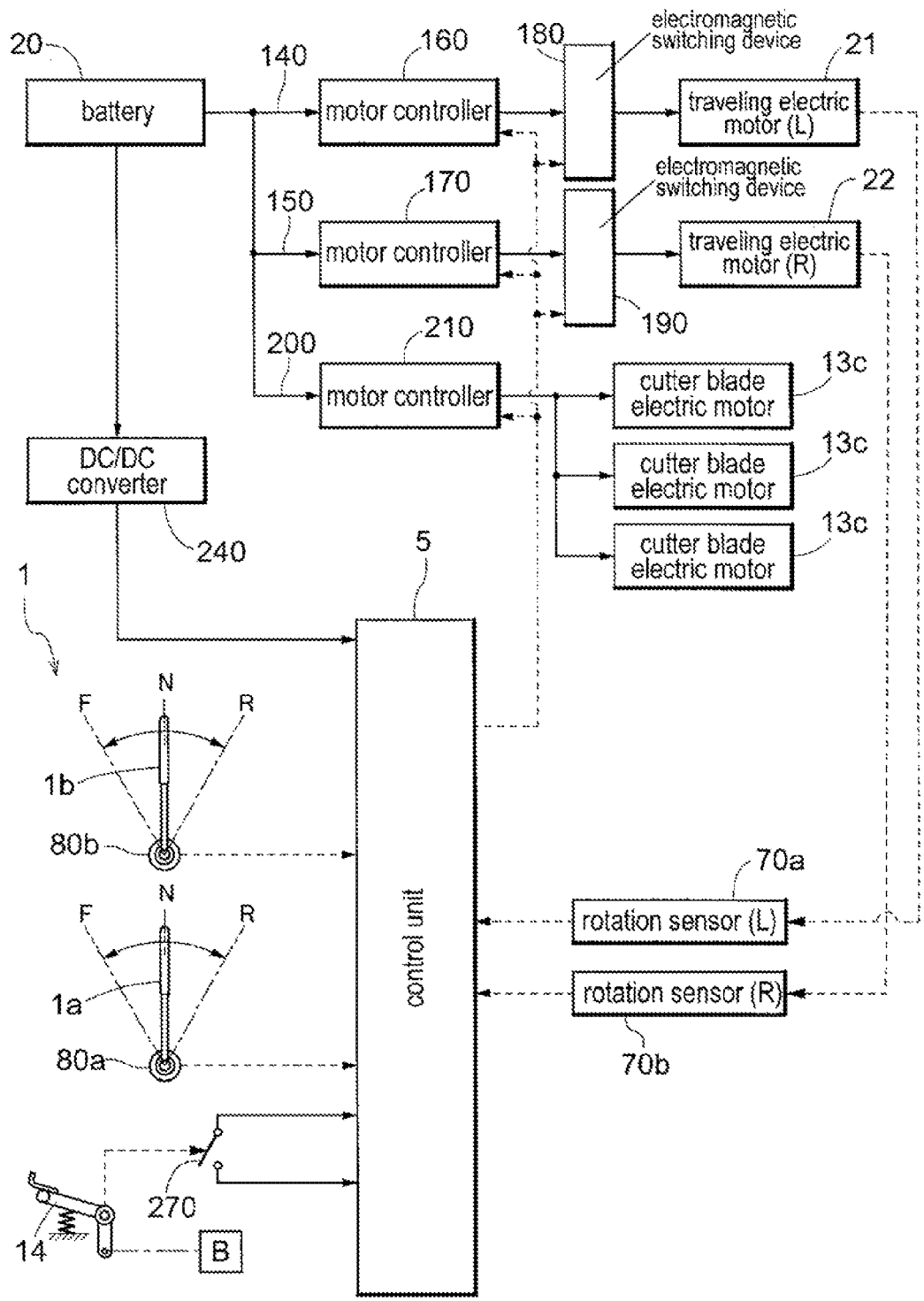
FIG. 16 is a control block diagram.

As shown in FIG. 16, power supply lines 140, 150 extending from this battery 20 to the right and left traveling electric motors 22, 21 respectively incorporate motor controllers 160, 170 for controlling the driving conditions of the traveling electric motors 21, 21 through variable adjustment of the voltages, currents, or frequencies. And, between each traveling electric motor 21, 22 and the motor controller 160, 170 corresponding thereto, there is provided an electromagnetic switching device 180, 190 for cutting off the electric power supply line 140, 150.

Incidentally, as the respective left/right electric motor 21, 22, there may be employed a three-phase AC electric motor, a brushless DC motor, etc. The motor controller 160, 170, though not shown, includes an inverter device, etc.

Further, a power supply line 200 extending from the battery 20 to each cutter blade electric motor 13c incorporates a motor controller 210 for controlling the driving condition of the respective cutter blade electric motors 13c.

As shown in FIG. 16, a control unit 5 is provided as a control unit for setting a target speed for each one of the traveling electric motors 21, 22 and commanding a control signal to each motor controller 160, 170, thereby to control the operation of the respective traveling electric motors 21, 22. The power to this control unit 5 is supplied after conversion of the voltage (about 48 V) of the battery 20 to a lower voltage (about 12V) through a DC/DC converter 240.

A brake switch 270 is provided adjacent the brake pedal 14 so that the brake switch 270 is urged for returning. This brake switch 270 is turned ON in response to a stepping-on operation on the brake pedal 14 and the switch 270 is turned OFF upon release of the stepping-on operation. The detection information of the brake switch 270 is inputted to the control unit 5. On the lateral side of the driver's seat 11, there is provided a mower ON/OFF switch 280 (see FIG. 15) which is turned ON upon commanding of start of driving of the mower unit 13 and turned OFF upon commanding of stop. Though not shown in FIG. 16; the detection information of the mower ON/OFF switch 280 too is inputted to the control unit 5.

Referring more particularly to the configuration of the control unit 5, when the brake switch 270 is turned ON, the left and right electromagnetic switching devices 180, 190 are switched to the cutoff states, thereby to stop driving of the traveling electric motors 21, 22. When the brake switch 270 is turned OFF, the left and right electromagnetic switching devices 180, 190 are switched to the conductive states, thereby to resume driving of the traveling electric motors 21, 22. Further, when the mower ON/OFF switch 280 is turned ON, the rotary cutter blades 13b are rotated so that the mower unit 13 effects a grass cutting operation. When the mower ON/OFF switch 280 is turned OFF, the rotations of the rotary cutter blades 13b are stopped, so that the grass cutting operation of the mower unit 13 is stopped. In this way, the control unit 5 is configured to control the operations of the respective cutter blade electric motors 13c.

As shown in FIG. 16, there are provided steering angle detection sensors 80a, 80b constituted of a pair of potentiometers for detecting respective operational positions of the maneuvering levers 1b, 1a. And, the detection information from this pair of steering angle detection sensors 80a, 80b is inputted to the control unit 5.

Therefore, the pair of maneuvering levers 1b, 1a and the steering angle detection sensors 80a, 80b together constitute a manually operable maneuvering unit 1 for commanding a traveling speed and a turning condition of the vehicle body.

Further, there are provided rotation detection sensors 70a, 70b comprised of a pair of rotary encoders for detecting rotational speeds of the right and left rear wheels 2b, 2a driven by the right and left traveling electric motors 22, 21. And, the detection information from these rotation detection sensors 70a 70b too is inputted to the control unit 5.

And, the control unit 5 is configured such that a target speed for each one of the traveling electric motors 21, 22 is set based on the detection information of the operational position of the maneuvering lever 1a, 1b detected by the steering angle detection sensor 80a, 80b and control commands are issued to the respective motor controllers 160, 170 so that the speeds of the left and right rear wheels 2a, 2b detected by the rotation detection sensors 70a 70b may become the respective target speeds. In this way, the control unit 5 is configured to control operations of the respective traveling electric motors 21, 22.

Namely, by pivotally operating the right and left maneuvering levers 1b, 1a by a same amount forwardly, the right and left rear wheels 2b, 2a are driven at a same speed in the forward direction, thereby to provide a straight forward traveling. By pivotally operating the right and left maneuvering levers 1b, 1a by a same amount in reverse, the right and left rear wheels 2b, 2a are driven at a same speed in the reverse direction, thereby to provide a straight reverse traveling.

Further, by differentiating the operational positions of the right and left maneuvering levers 1b, 1a to differentiate the speeds of the right and left rear wheels 2b, 2a from each other, the vehicle 10 can be turned in the desired direction. And, by operating either one of the right and left rear wheels 2b, 2a at a low speed near the zero speed and operating the other wheel 2a, 2b at a high speed in the forward or reverse direction, a small turn is made possible.

Furthermore, by operating the right and left maneuvering levers 1b, 1a in opposite directions from the respective neutral positions thereof for rotatably driving the right and left rear wheels 2b, 2a in the opposite directions, the vehicle can be spin-turned with substantially the center between the right and left rear wheels 2b, 2a being the pivotal center. As the pair of right and left front wheels 3b, 3a are configured as caster wheels whose orientations about the respective vertical axes can be freely changed, the orientations will be changed according to, i.e. following change of the direction of travel by the right and left rear wheels 2b, 2a.

Figure 17:
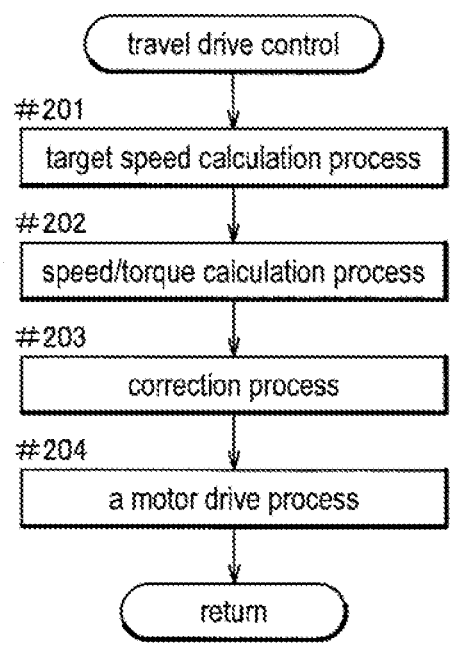
FIG. 17 is a flowchart of a travel drive control.

With reference to the flowchart shown in FIG. 17, the travel drive control by the control unit 5 will be described in specific. This travel drive control is configured to execute control processes as shown in FIG. 17 for each unit period, in repetition.

First, the control unit 5 executes a "target speed calculation process" for obtaining a target speed for each electric motor based on command information from the left/right maneuvering lever 1a, 1b (step #201). In this target speed calculation process, operational positions of the maneuvering levers 1a, 1b are read based on the detection values of the left and right steering angle sensors 80a, 80b; and based on the detection values of the respective maneuvering angle detection sensors 80a, 80b, "operational position corresponding speeds" corresponding to the operational positions are obtained respectively, and then, based on these operational position corresponding speeds, the target speeds for the respective travel drive motors 21, 22 are calculated.

In this target speed calculation process, for obtaining the operational position corresponding speeds, the control unit 5 obtains the respective operational position corresponding speeds, corresponding to the operational positions detected by the maneuvering angle detection sensors 80a, 80b, based on changing characteristics of the operational positions and the operational position corresponding speeds, which changing characteristics are set in advance such that the more toward the acceleration side the operational positions are, the greater the operational position corresponding speeds.

Figure 18:
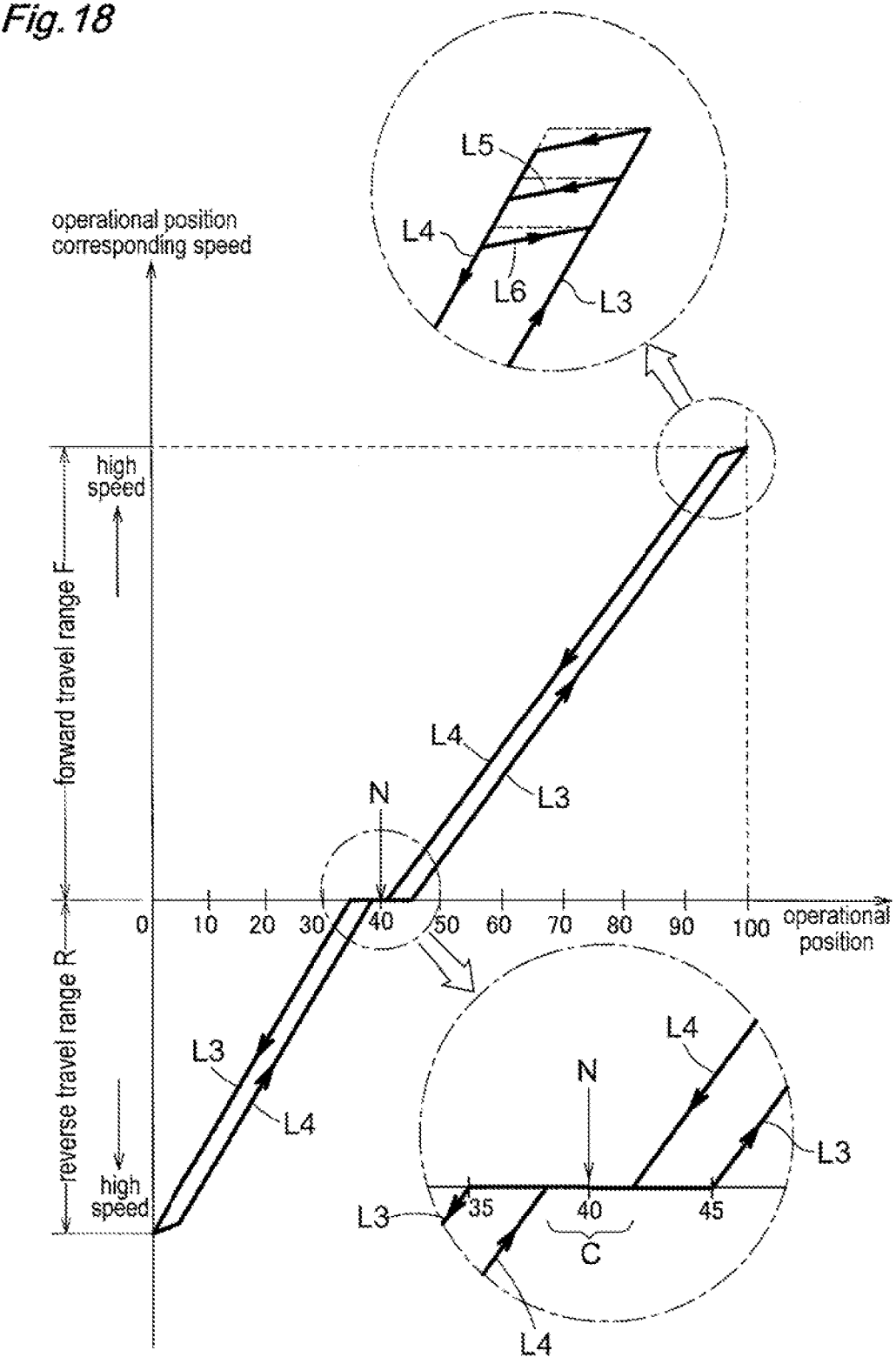
FIG. 18 is a view showing change characteristics of an operational position and an operational position corresponding speed and, FIG. 19 is a view showing the change characteristics of speed torque in one example.

The changing characteristics of the operational positions and the operational position corresponding speeds are changing characteristics between the two as those illustrated in FIG. 18, for instance, which will be described next. In FIG. 18, a horizontal axis represents operational positions detected by the maneuvering angle detection sensors 80a, 80b, whereas a vertical axis represents the operational position corresponding speeds. The operational position varies from the minimal position (0) to the maximum position (100). Whereas, the operational position corresponding speeds are divided between those in a forward rotation range (forward travel range F) and those in a reverse rotation range (reverse travel range R). From the minimal position (0) to the maximum position (100), the range from the neutral position (40) to the maximum position (100) (e.g. 60% range of all the operational range) is set as the forward range (forward travel range F) and the range from the minimal position (0) to the neutral position (40) is set as the reverse range (reverse travel range R).

In the vicinity of the neutral position N, there is set an insensitive range C (e.g. about 5% area of the entire operational range) wherein the operational position corresponding speed maintains the zero speed despite a slight change, if any, in the operational position of the maneuvering lever 1a, 1b. Further, for the forward rotation range (forward travel range F) and the reverse rotation range (reverse travel range R) respectively, there are set an acceleration changing characteristics L3 which are applied when the operational position of the maneuvering lever 1a, 1b is changed to the acceleration side and a deceleration changing characteristics L4 which is applied when the operational position of the maneuvering lever 1a, 1b is changed to the deceleration side.

As shown in FIG. 18, the acceleration changing characteristics L3 vary linearly both in the forward rotation range (forward travel range F) and the reverse rotation range (reverse travel range R). In other words, the acceleration changing characteristics L3 are changing characteristics which provides constant operational position corresponding speed variation relative to variation in the operational position of the maneuvering lever 1a, 1b. Also, the deceleration changing characteristics L4 too vary linearly like the acceleration changing characteristics L3.

When the maneuvering lever 1a, 1b is operated toward the acceleration side from the neutral position N, the operational position corresponding speed is obtained, based on the operational position obtained from the detection value of the maneuvering angle sensor 80a, 80b and the acceleration changing characteristics L3 illustrated in FIG. 18. On the other hand, when the maneuvering lever 1a, 1b is operated toward the deceleration side from the neutral position N, the operational position corresponding speed is obtained, based on the operational position obtained from the detection value of the maneuvering angle sensor 80a, 80b and the deceleration changing characteristics L4 illustrated in FIG. 18.

When the maneuvering lever 1a, 1b is switched from a condition operated to the acceleration side position to a condition operated to the deceleration side, the operational position corresponding speed does not vary according to the acceleration changing characteristics L3 or the deceleration changing characteristics L4, but as illustrated also in a partially enlarged view in FIG. 18, the operational position corresponding speed varies along a switching changing characteristics L5. The switching changing characteristics L5 are set such that a change amount (i.e. gradient) in the output value of the operational position corresponding speed relative to a unit amount change in the operational position is smaller than that of the acceleration changing characteristics L3 and that of the deceleration changing characteristics L4 (e.g. about ⅕ thereof).

Similarly, when the maneuvering lever 1a, 1b is switched from a condition operated to the deceleration side to a condition operated to the acceleration side, the operational position corresponding speed varies along a switching changing characteristics L6 which is set such that a change amount (i.e. gradient) in the output value of the operational position corresponding speed relative to a unit amount change in the operational position is smaller than that of the acceleration changing characteristics L3 and that of the deceleration changing characteristics L4 (e.g. about ⅕ thereof). Incidentally, the partially enlarged view in FIG. 18 illustrates an enlarged portion of the operational positions adjacent the maximum position (100). However, the switching changing characteristics L5 and the switching changing characteristics L6 are applied to the entire operational range of the operational positions varying from the minimal position (0) to the maximum position (100).

With the above-described arrangements, even if the maneuvering lever 1a, 1b is pivoted in the fore/aft direction against the driver's intension due to vibration of the vehicle body during a work traveling, unnecessary speed change operation of the target speed being changed in response to such pivotal movement can be restricted, so that the traveling stability can be readily maintained.

After execution of the target speed calculation process, the control unit 5 executes a "speed/torque calculation process" (step #202) for obtaining a control command speed to be commanded to each travel drive electric motor 21, 22 and a control command drive torque required for obtaining the control command speed, based on the target speed obtained for the respective travel electric motor 21, 22 in the target speed calculation process and the rotational speed of the respective travel electric motor 21, 22 detected by the left/right rotation detection sensor 70a, 70b.

First, the method of obtaining the control command speed will be explained.

The control command speed V1 for the respective travel electric motor 21, 22 is obtained by Formula 1 and Formula 2 below:

$$V1 = V2 + \Delta V \quad \text{(Formula 1)}$$

$$\Delta V = K1 + K2 \cdot V0a + K3 \cdot (V0a - V2) + K4 \cdot (V0a - V0b) \quad \text{(Formula 2)}$$

where
V2: current rotational speed of electric motor
V0a: target speed for one electric motor
V0b: target speed for the other electric motor
K1, K2, K3, K4: coefficients
with the proviso that $\Delta V = 0$, if $V1 > V0a > 0$ or if $0 < V0a < V1$.

That is, the control command speed V1 is calculated as a value which is obtained by varying the current rotational speed V2 by a set unit amount $\Delta V$. And, this set unit amount $\Delta V$ is set as follows. Namely, the greater the target speed V0a, the greater the set unit amount $\Delta V$. Also, the greater the deviation between the target speed V0a and the current rotational speed V2, the greater the set unit $\Delta V$. Further, the greater the difference between the target speeds V0a, V0b of the travel electric motors 21, 22, the greater the set unit $\Delta V$.

Since the greater the set unit $\Delta V$ is set the greater as the difference becomes the greater between the target speeds V0a, V0b of the travel electric motors 21, 22, during a turning travel, if the subject travel electric motor (21 or 22) is the electric motor corresponding to the rear wheel 2 lying on the outer side during the turn, the last term: (K4·(V0a−V0b)) in Formula 2a or 2b has a positive value, thus providing an addition. On the other hand, if the subject travel electric motor (21 or 22) is the electric motor corresponding to the rear wheel 2a or 2b lying on the inner side during the turn, the last term: (K4·(V0a−V0b)) in Formula 2 has a negative value, thus providing a subtraction.

Next, the method of obtaining the control command drive torque will be explained.

The control command drive torque T1 for the respective travel electric motor 21, 22 is obtained by Formula 3 and Formula 4 below:

$$T1 = V2 + \Delta T \quad \text{(Formula 3)}$$

$$\Delta T = K5 + K6 \cdot V0a + K7 \cdot (V0a - V2) + K8 \cdot (V0a - V0b) \quad \text{(Formula 4)}$$

where
T2: current output torque
V2: current rotational speed of electric motor
V0a: target speed for one electric motor
V0b: target speed for the other electric motor
K5, K6, K7, K8: coefficients In the above, if the drive torque is a forward rotation torque, then, the torque is decreased if $V2 > V1 > 0$ ($\Delta T < 0$) and the torque is increased if $V1 > V2 > 0$ ($\Delta T > 0$). Further, if the drive torque is a reverse rotation torque (regeneration braking condition), the torque is decreased if $V2 < V1 < 0$ ($\Delta T < 0$) and the torque is increased if $V1 < V2 < 0$ ($\Delta T > 0$).

That is, the control command drive torque T1 is calculated as a value which is obtained by varying the current output torque T2 by a set unit amount $\Delta T$. And, the unit amount $\Delta T$ is set as follow. Namely, the greater the target speed V0a, the greater the set unit amount $\Delta T$. Also, the greater the deviation between the target speed V0a and the current rotational speed V2, the greater this set unit $\Delta T$. Further, the greater the difference between the target speeds V0a, V0b of the travel electric motors 21, 22, the greater this set unit $\Delta T$.

Since the set unit amount $\Delta T$ is set the greater as the difference becomes the greater between the target speeds V0a, V0b for the respective travel electric motor 21, 22, during a turning travel, if the subject travel electric motor (21 or 22) is the electric motor corresponding to the rear wheel 2a, 2b lying on the outer side of the turn, the last term: (K4·(V0a−V0b)) in Formula 4 has a positive value, thus providing an addition. On the other hand, if the subject travel electric motor (21 or 22) is the electric motor corresponding to the rear wheel 2 lying on the inner side of the turn, the last term: (K4·(V0a−V0b)) in Formula 4 has a negative value, thus providing a subtraction.

Therefore, the control unit 5 calculates the control command drive torque for the respective travel electric motor 21, 22 such that the unit increase amount of the control command drive torque for the travel electric motor corresponding to the turning outer side rear wheel 2a, 2b is set greater than the unit increase amount of the control command drive torque for the travel electric motor corresponding to the turning inner side rear wheel 2a, 2b.

After execution of the speed/torque calculation process, in case the control command speed and the control command drive torque obtained by this speed/torque calculation process are in an output restricted range (short period operation possible range W2 or the output impossible range W3) that exceeds a rated range W1 wherein continuous operation of the electric motor is possible, the control unit 5 executes a "correction process" for correcting the control command speed and the control command dive torque such that the speed difference between the control command speeds of the pair of respective travel motors 21, 21 may be maintained at a speed difference corresponding to the turning condition commanded by the right and left maneuvering levers 1b, 1a and also the control command speed and the control command drive torque may be returned to the rated range W1 (step #203).

Figure 19:
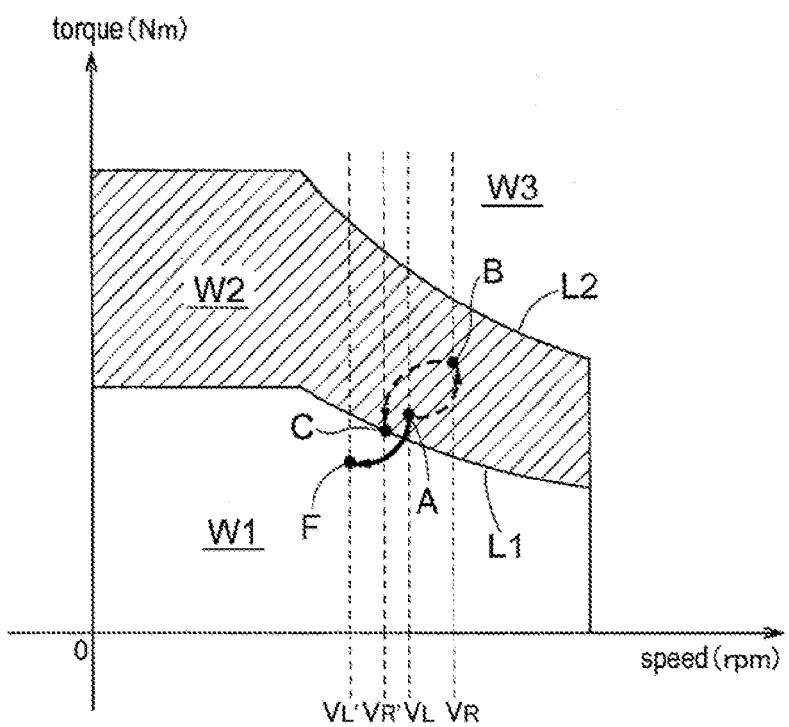

The above will be explained by way of some specific examples thereof. FIG. 19 shows the speed torque characteristics of the travel electric motors 21, 22. These travel electric motors 21, 22 have the characteristics that the drive torque that can be outputted is large when the rotational speed is low, but the drive torque that can be outputted is restricted to a relatively small value when the rotational speed is high; and further that in the area exceeding the rated range W1 where continuous operation is possible, there is provided a short period operation possible range W2 wherein the operation is possible only during lapse of a predetermined period.

In the example illustrated in FIG. 19, the area located below a line L1 represents the rated range W1 and an area located upwardly of the line L1 and downwardly of a line L2 and shown with shading in oblique lines represents the short period operation possible range W2. The area upwardly of the line L2 represents the output impossible range W3.

Suppose the control command speeds and the control command drive torques for the pair of right and left travel electric motors 22, 21 are currently at point A in FIG. 19; and a point B (velocity VR) is now commanded as a control command speed and a control command drive torque for the right travel electric motor 22 in order to make a left turn from the current straight traveling condition moving at a vehicle speed VL. Then, immediately after the commanding of the point B, the commanded control command speed and control command drive torque will be outputted for a while as they are. But, upon lapse of the predetermined period, a correction is made for correcting the control command speed an the control command drive torque for the right travel drive motor 22 to a point C (velocity VR') corresponding to the maximum value of the rated range W1. And, relative to this point C, the control command speed and the control command drive torque for the left travel electric motor 21 are corrected to a new point F (velocity VL') within the rated range W1 with maintaining a speed difference between the target speeds of the right and left sides obtained based on the command information by the right and left maneuvering levers 1*b*, 1*a*.

With the above-described corrections of the control command speeds and the control command drive torques, the travel speed will be reduced from the commanded speed, but the speed difference between the right and left rear wheels 2*b*, 2*a* can be maintained to the speed difference corresponding to the command information from the right and left maneuvering levers 1*b*, 1*a*.

Figure 20:
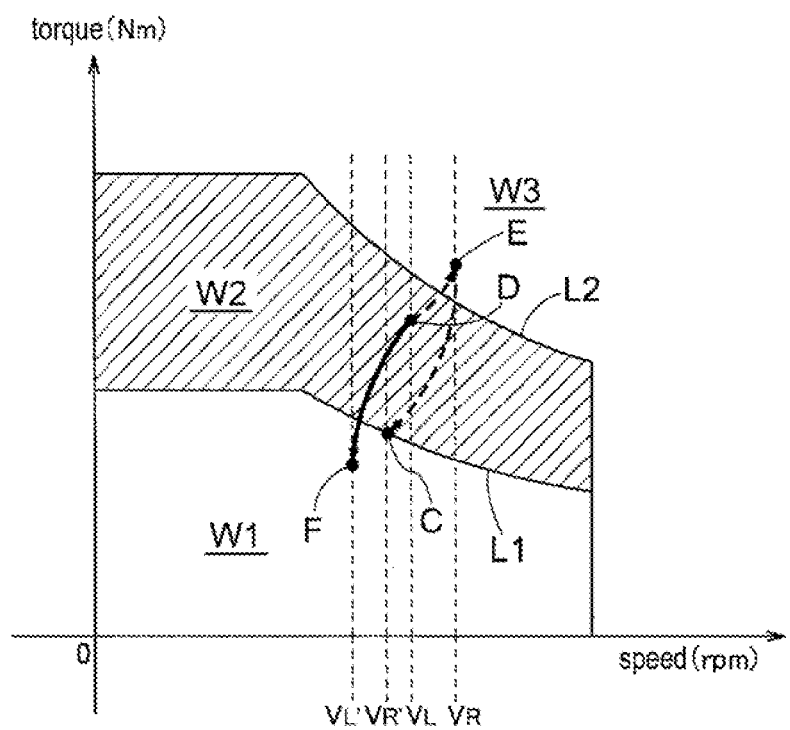
FIG. 20 is a view showing the change characteristics of speed torque in a further example.

With reference to a further example as illustrated in FIG. 20, suppose the control command speeds and the control command drive torques of the pair of right and left travel electric motors 22, 21 are both currently at a position D in FIG. 20; and now, as a control command speed and a control command drive torque for the right travel electric motor 22, a point E in the output impossible range W3 exceeding the short period possible range W2 is commanded.

In this case, as to the right travel drive electric motor 22, driving thereof at the commanded point E is not possible. Therefore, correction is immediately made for the control command speed and the control command drive torque for the right travel electric motor 22 for correcting these to the point C (velocity VR') corresponding to the maximum value in the rated range W1; whereas, the control command speed and the control command drive torque for the left travel electric motor 21 are corrected to a new point F (velocity VL') within the rated range W1 with maintaining a speed difference between the target speeds of the right and left sides obtained based on the command information by the right and left maneuvering levers 1*b*, 1*a*. In this case too, the speed difference between the right and left rear wheels 2*b*, 2*a* can be maintained to the speed difference corresponding to the command information of the right and left maneuvering levers 1*b*, 1*a*.

After execution of the correction process, the control unit 5 executes a "motor drive process" for controlling the operations of the respective travel electric motors 21, 22 by generating and sending control signals to the respective motor controllers 160, 170 so that the rotational speeds of the pair of right and left travel electric motors 22, 21 detected by the rotation detection sensors 70*b*, 70*a* may become the control command speeds after the correction in the correction process and also that the control command drive torques after the corrections may be outputted (step #204).

If the brake switch 270 detects a step-on operation on the brake pedal 14 during execution of the travel drive control described above, the control unit 5 switches OFF the electromagnetic switching devices 180, 190, so as to prevent excessive load from being applied to the travel electric motors 21, 22.

Further, though not detailed, during execution of a control, if there is detected an operation abnormality such as the electric current to be supplied to the cutter blade electric motor 13*c* having an abnormal value due to clogging of grass in the mower unit 13, the control unit 5 causes automatic stop of the vehicle or prompts a braking operation by issuing an alarm by an alarming means such as an unillustrated alarm buzzer.

Modified Embodiments of Third Embodiment (1) In the foregoing embodiment, the control unit executes, as a speed/torque calculation process, the control unit calculates control command drive torques for the respective electric motors 21, 22 with setting the unit change amount of the control command drive torque for the electric motor 21, 22 of the pair of electric motors corresponding to the turning outer side travel device greater than the unit change amount of the control command drive torque for the electric motor 21, 22 of the pair of electric motors corresponding to the turning inner side travel device. However, this process can be omitted.

(2) In the foregoing embodiment, the electric motor 21, 22 has, as an output restricted range, the short period operation possible range W2 wherein the operation is possible only during lapse of a predetermined period. However, this short period operation possible range W2 can be omitted.

(3) In the foregoing embodiment, the maneuvering unit includes a pair of left and right maneuvering levers 1*b*, 1*a* and a pair of maneuvering angle detection sensors 80*a*, 80*b* for detecting their operational positions. Instead of this arrangement, the maneuvering unit can be comprised of a maneuvering lever capable of freely changing the vehicle speed, a turning operational tool for commanding a turning condition, a vehicle speed detector and a turning angle detector for detecting operational positions thereof. Further, the turning operational tool is not limited to the lever type operational tool, but can be a circular handle.

Other Embodiments (1) In the first embodiment described above, as the drive unit, there was employed an electric motor which is inverter-controlled. However, any other control mode can be employed.

(2) In the foregoing embodiment, the self-propelled vehicle was constructed as a fully electric vehicle using a battery as its drive source or an HST vehicle having an HST for changing speed of the rotational power of the engine (internal combustion engine). Instead, the self-propelled vehicle may be a hybrid type vehicle wherein a generator is rotated by a drive power of an engine for charging a battery.

(3) In the foregoing embodiment, a riding type grass mower was shown as an example of the self-propelled vehicle. However, as examples of riding work vehicles to which the present invention is applicable, there can be cited, in addition to the grass mower, a fork lift, a cultivator, a tractor, a rice planter, a combine-harvester, a civil engineering/construction work machine, a snow removal vehicle, etc.

What is claimed is:

1. A self-propelled vehicle comprising:
   a vehicle body;
   a maneuvering unit mounted on the vehicle body and operated by a driver aboard the vehicle body;
   a control unit for generating a control amount for changing a travel speed and a travel direction of the vehicle, based on an operational amount of the maneuvering unit;
   at least one freely steerable caster wheel;
   a drive unit including a first drive section and a second drive section which are driven and controlled independently of each other by said control amount;
   a drive wheel unit including a left drive wheel driven for traveling by the first drive section and a right drive wheel driven for traveling by the second drive section; and
   a bank detector for detecting a degree of bank of the vehicle and outputting it to said control unit;
   wherein the drive unit is configured to output a drive torque to the left drive wheel via the first drive section and the right drive wheel via the second drive section, and the drive torque output by the drive unit to the left drive wheel and the right drive wheel, respectively, causes rotation of the left drive wheel and the right drive wheel;
   wherein a travel direction of the vehicle is changed by the drive unit outputting different drive torques to the left drive wheel and the right drive wheel to cause a rotation difference between the left drive wheel and the right drive wheel; and
   wherein said control unit includes:
      a processing section for receiving a measured actual rotation speed of the left drive wheel and a measured actual rotation speed of the right drive wheel;
      a base control amount calculation section for determining a target rotational speed for the left drive wheel and a target rotational speed for the right drive wheel based on the control amount;
      a drive torque calculation section for calculating a drive torque required to be output by the drive unit for resolving a difference between the target rotational speed and the actual rotation speed in each of said first drive section and said second drive section;
      a compensation torque calculation section for calculating a compensation torque to be output by the drive unit for resolving a direction difference between a target travel direction and an actual travel direction in a bank traversing travel, for said first drive section and said second drive section based on said bank degree; and
      a correction section for correcting said control amount based on said required drive torque and said compensation torque for offsetting a force in an inclinedly downward direction applied to the left drive wheel and the right drive wheel during the bank traversing travel by adding said compensation torque to said required drive torque.

2. A self-propelled vehicle according to claim 1, wherein said drive torque calculation section calculates the required drive torque, based on the target rotational speed and an actual rotational speed in each of the first drive section and the second drive section.

3. A self-propelled vehicle according to claim 1, wherein said compensation torque calculation section includes a compensation torque deriving table for deriving said compensation torque by using, as an input parameter thereof, a vehicle bank degree during a bank travel, said table being constructed through experiments and learning.

4. A self-propelled vehicle according to claim 3, wherein said compensation torque deriving table further includes a vehicle weight distribution value which is set as another input parameter thereof.

5. A self-propelled vehicle according to claim 1, wherein the drive unit is constituted of an electric motor.

6. A self-propelled vehicle according to claim 1, wherein the drive unit is constituted of a hydrostatic transmission device.

* * * * *